(12) United States Patent
Kim et al.

(10) Patent No.: US 12,288,386 B2
(45) Date of Patent: *Apr. 29, 2025

(54) CONTROL METHOD OF IMAGE SIGNAL PROCESSOR AND CONTROL DEVICE FOR PERFORMING THE SAME

(71) Applicant: DEEPX CO., LTD., Seongnam-si (KR)

(72) Inventors: Lok Won Kim, Seongnam-si (KR); Sun Mi Lee, Seongnam-si (KR); Il Myeong Im, Seoul (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,869

(22) Filed: Feb. 26, 2024

(65) Prior Publication Data

US 2024/0193922 A1 Jun. 13, 2024

Related U.S. Application Data

(63) Continuation of application No. 17/981,623, filed on Nov. 7, 2022, now Pat. No. 11,941,871, which is a continuation of application No. PCT/KR2022/011341, filed on Aug. 1, 2022.

(30) Foreign Application Priority Data

Jul. 30, 2021 (KR) .......................... 10-2021-0100774

(51) Int. Cl.
*G06V 10/776* (2022.01)
*G06V 10/24* (2022.01)
*G06V 10/82* (2022.01)

(52) U.S. Cl.
CPC ............ *G06V 10/776* (2022.01); *G06V 10/24* (2022.01); *G06V 10/82* (2022.01)

(58) Field of Classification Search
CPC ...... G06V 10/776; G06V 10/24; G06V 10/82; G06N 3/063; G06N 3/04; G06N 3/08; G06T 3/4015; G06T 7/80; G06T 3/404606; G06T 7/97; G06T 2207/20081; G06T 2207/20
USPC ......................................................... 382/156
See application file for complete search history.

(56) References Cited

U.S. PATENT DOCUMENTS

| 2020/0050842 | A1* | 2/2020 | Kim | ..................... G06V 40/166 |
| 2021/0133572 | A1* | 5/2021 | Choi | ........................ G06N 3/08 |
| 2022/0058773 | A1* | 2/2022 | Chou | ........................ G06T 5/73 |
| 2022/0309712 | A1* | 9/2022 | Lee | ............................ G06T 7/90 |
| 2023/0177663 | A1* | 6/2023 | Chae | ....................... G10L 25/57 |
| | | | | 382/157 |
| 2024/0104912 | A1* | 3/2024 | Kim | ...................... G06V 10/25 |

FOREIGN PATENT DOCUMENTS

KR 20190143527 A * 12/2019 ............. G06N 20/00

* cited by examiner

*Primary Examiner* — Juan A Torres
(74) *Attorney, Agent, or Firm* — INVENSTONE PATENT, LLC

(57) ABSTRACT

A control method of an image signal processor for an artificial neural network may be configured to include a step of acquiring an image, a step of determining at least one image characteristic data corresponding to the image, and a step of determining an image correction parameter (SFR preset) for improving an inference accuracy of an artificial neural network model based on the at least one of image characteristic data and an inference accuracy profile of an artificial neural network model.

24 Claims, 17 Drawing Sheets

CONTROL METHOD OF IMAGE SIGNAL PROCESSOR AND CONTROL DEVICE FOR PERFORMING THE SAME

CROSS-REFERENCE TO RELATED APPLICATIONS

This application is a continuation application of U.S. patent application Ser. No. 17/981,623, filed on Nov. 7, 2022, which is a continuation of International Application No. PCT/KR2022/011341, filed on Aug. 1, 2022, which claims the benefit of priority to Korean Application No. 10-2021-0100774, filed on Jul. 30, 2021 in the Korean Intellectual Property Office.

BACKGROUND

Technical Field

The present disclosure relates to a method for controlling an image signal processor and a control device for performing the same. Specifically, the present disclosure relates to a control method of an image signal processor for an artificial neural network and a control device for performing the same.

Background Art

A camera may improve image quality by processing raw image data acquired from an image sensor through an image signal processor (ISP). Such an image signal processor (ISP) is typically adjusted to their settings by an imaging expert. Accordingly, even with the same raw image data, the image processing result is different depending on the operator's tendency, visual perception, cognitive ability, and the like.

On the other hand, as various artificial neural networks are grafted into the field of computer vision due to the recent development of machine learning, various technologies for detecting objects in images taken with a camera are being developed. If an image signal processor (ISP) whose camera settings are adjusted by a person is used, the image data used for learning/verification/inference may be non-uniform depending on the characteristics of the operator, so there is a limit to improving the inference accuracy of the artificial neural network model. Rather, the inference accuracy of the artificial neural network model may be lowered.

The description that is the background of the present disclosure has been made to make the present disclosure easier to understand. It should not be construed as an admission that the matters described in the background technology of the present disclosure exist as prior art.

SUMMARY OF THE DISCLOSURE

In order to improve the detection rate of an artificial neural network model, a technique for preprocessing the resolution of conventional raw image data has been disclosed. However, there is a disadvantage that a separate processor for the artificial neural network model is required for this.

In addition, a technique for improving the detection rate of an artificial neural network model while gradually manipulating the settings of the conventional image signal processor (ISP) has been disclosed. However, since the characteristics of the artificial neural network model are not fundamentally considered, whenever a new image is input to the artificial neural network model, there is an inconvenience in that the image signal processor has to repeatedly perform the above operation.

Accordingly, there is a need for a method capable of selecting an inference accuracy profile of an artificial neural network model according to image data characteristics, and controlling a parameter of an image signal processor (ISP) based on the inference accuracy profile, and an apparatus for performing the same.

Accordingly, the inventors of the present disclosure attempted to develop for a method capable of selecting an inference accuracy profile of an artificial neural network model according to image data characteristics, and controlling a parameter of an image signal processor (ISP) based on the inference accuracy profile, and an apparatus for performing the same.

In particular, the inventors of the present disclosure have configured a method and an apparatus to significantly improve mAP (mean average precision) of an artificial neural network model by providing the image signal processor (ISP) to subdivide the preprocessing degree according to the image characteristics so that the image can be processed evenly.

The tasks of the present disclosure are not limited to the tasks mentioned above, and other tasks not mentioned will be clearly understood by those skilled in the art from the following description.

In order to solve the above problems, a control method of an image signal processor for an artificial neural network according to an example of the present disclosure is provided.

A control method of an image signal processor for an artificial neural network according to an example of the present disclosure may include a step of acquiring an image, a step of determining at least one image characteristic data corresponding to the image, and a step of determining an image correction parameter for improving an inference accuracy of an artificial neural network model based on the at least one image characteristic data and an inference accuracy profile of at least one artificial neural network model.

According to an example of the present disclosure, the at least one image characteristic data may include at least one of a histogram of the image (RGB, CbCr, Y histogram), an RGB maximum value, an RGB minimum value, a mean of pixel values, a standard deviation, an RGB sum of each pixel (sum of color values), a signal-to-noise ratio (SNR), frequency content, and edge content.

According to an example of the present disclosure, the step of determining the image correction parameter may include a step of analyzing the inference accuracy profile indicating a change in inference accuracy of the artificial neural network model, and a step of determining the image correction parameter for determining a degree of preprocessing of the image input to the artificial neural network model based on the inference accuracy profile and the image characteristic data.

According to the present disclosure, the step of analyzing the inference accuracy profile may be the step of determining the change in inference accuracy of the artificial neural network model based on at least one image characteristic of brightness, noise, blurriness level, contrast ratio, and color temperature of the image.

According to an example of the present disclosure, the change in inference accuracy may indicate the inference accuracy of the artificial neural network model that changes according to a characteristic level of the image.

According to an example of the present disclosure, the step of analyzing the inference accuracy profile of the artificial neural network model may include a step of step-by-step modulating a reference image dataset applied to the artificial neural network model based on the at least one image characteristic, and a step of calculating a mean average precision (mAP) of the artificial neural network model for a plurality of image datasets modulated for each step.

According to an example of the present disclosure, the step of determining the image correction parameter may be a step of determining at least one of a plurality of image correction parameter presets using a preset library matched with the image signal processor that processes the image.

According to an example of the present disclosure, the step of determining the image correction parameter may include a step of calculating a compensation function for selectively determining the image correction parameter by matching the inference accuracy profile with the image characteristic data.

According to an example of the present disclosure, the image correction parameter may correspond to a value of a special function register of the image signal processor that processes the image.

According to an example of the present disclosure, the control method of the image signal processor for the artificial neural network may further include a step of receiving a processed image based on the image correction parameter from the image signal processor that processes the image, and a step of outputting an inference result by inputting the processed image to the artificial neural network model.

According to the present disclosure, the control method of the image signal processor for the artificial neural network may further include a step of identifying an image sensor and the image signal processor capable of acquiring and processing the image.

According to an example of the present disclosure, the step of determining the image correction parameter may further include a step of correcting a compensation function for determining the image correction parameter by controlling a capturing parameter of the image sensor.

According to an example of the present disclosure, the step of determining the image correction parameter may be a step of determining the image correction parameter for improving the inference accuracy of a plurality of artificial neural network models based on the inference accuracy profile of the plurality of artificial neural network models stored in a memory.

In order to solve the above problems, an image processing system for an artificial neural network according to another example of the present disclosure is provided.

According to an example of the present disclosure, an image processing system for an artificial neural network may include an image signal processor configured to image-process an image; and a compensation unit operatively coupled to the image signal processor.

According to an example of the present disclosure, the compensation unit may be configured to acquire the image, generate at least one image characteristic data corresponding to the image, obtain at least one inference accuracy profile, and determine an image correction parameter of the image signal processor based on the at least one image characteristic data and the at least one inference accuracy profile.

According to an example of the present disclosure, the image characteristic data may include at least one of a histogram of the image (RGB, CbCr, Y histogram), an RGB maximum value, an RGB minimum value, a mean of pixel values, a standard deviation, an RGB sum of each pixel (sum of color values), a signal-to-noise ratio (SNR), frequency content, and edge content.

According to an example of the present disclosure, the image processing system for the artificial neural network may further include a neural processing unit configured to process an artificial neural network model.

According to an example of the present disclosure, the compensation unit may be configured to selectively determine the image correction parameter that determines a degree of preprocessing of the image input to the artificial neural network model based on the at least one inference accuracy profile and the image characteristic data.

According to an example of the present disclosure, the at least one inference accuracy profile may include information on change in inference accuracy of the artificial neural network model corresponding to at least one of brightness, noise, blurriness level, contrast ratio, and color temperature of the image.

According to an example of the present disclosure, the compensation unit may further include a preset library configured to control the image signal processor.

According to an example of the present disclosure, the compensation unit may selectively determine at least one of a plurality of image correction parameter presets of the preset library.

According to an example of the present disclosure, the image correction parameter may correspond to a special function register value of the image signal processor.

According to an example of the present disclosure, the neural processing unit may be configured to receive the image processed by the image signal processor, input the processed image to the artificial neural network model, and output an inference result.

According to an example of the present disclosure, the image processing system for the artificial neural network may further include an image sensor capable of acquiring an image.

According to an example of the present disclosure, the compensation unit may be configured to control a capturing parameter of the image sensor based on the at least one inference accuracy profile.

According to an example of the present disclosure, the compensation unit may be configured to identify the image signal processor.

According to an example of the present disclosure, the neural processing unit may be configured to process an inference operation of the artificial neural network model based on the processed image and weights of the artificial neural network model.

The specific details of other examples are included in the detailed description and in the accompanying drawing figures.

The present disclosure selects an image characteristic and an inference accuracy profile of an artificial neural network model, and provides a detailed control value of an image signal processor (ISP) based thereon so that the image can be processed without biasing at least one attribution.

In addition, the present disclosure can reduce time and cost compared to the prior art of simply providing control values of an image signal processor (ISP) through gradual transformation by numerically calculating the inference accuracy of an artificial neural network model that changes according to the level of image characteristics, and providing a control value based on this.

In addition, the present disclosure can improve the inference accuracy of the artificial neural network model through control of the control value (image correction parameter, SFR preset) of the image signal processor (ISP).

In addition, the present disclosure provides different control values (image correction parameters, SFR presets) according to the types of the image sensor, image signal processor (ISP), and artificial neural network model, thereby increasing inference accuracy.

Effects according to the present disclosure are not limited by the contents exemplified above, and more various effects are included in the present disclosure.

DETAILED DESCRIPTION OF THE EMBODIMENT

Figure 1:
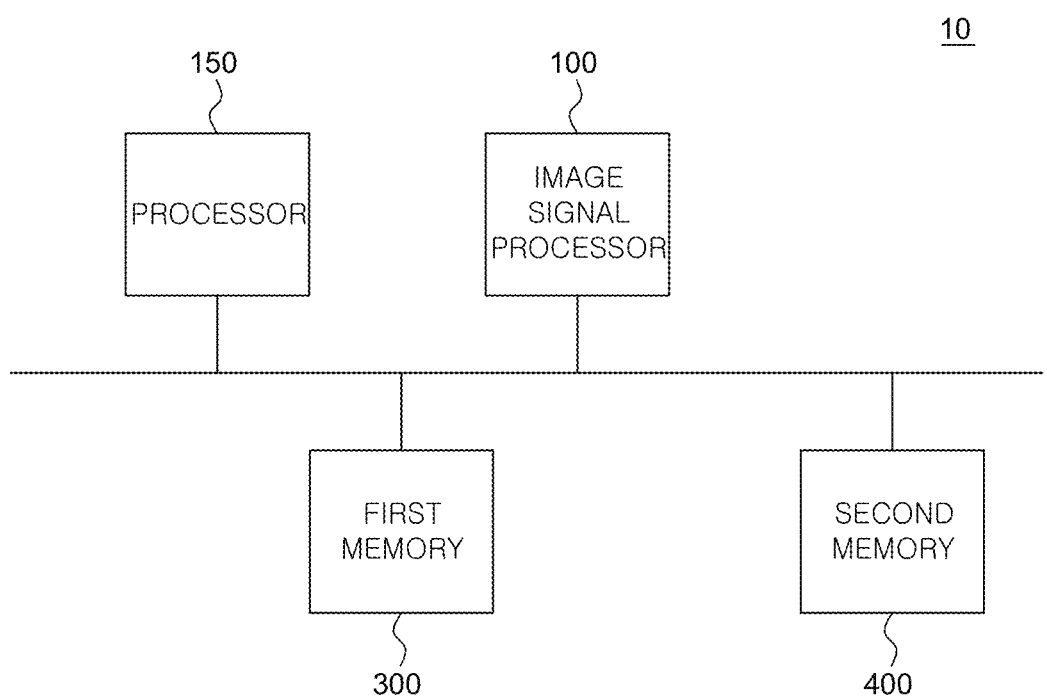
FIG. 1 is a schematic conceptual diagram of an image processing system for an artificial neural network according to an example of the present disclosure.

Advantages and features of the present disclosure, and methods of achieving them, will become apparent with reference to the examples described below in detail in conjunction with the accompanying drawings. However, the present disclosure is not limited to the examples disclosed below and will be implemented in various different forms. These examples are provided so that the present disclosure is complete, and to fully inform those of ordinary skill in the art to which the present disclosure belongs, the scope of the present disclosure, which is only defined by the scope of the claims. In connection with the description of the drawings, like reference numerals may be used for like elements.

In this document, expressions such as "have," "may have," "includes," or "may include" indicate the presence of the corresponding feature (e.g., an element such as a numerical value, function, action, or part), and do not exclude the existence of the additional feature.

In this document, expressions such as "A or B," "at least one of A or/and B," or "one or more of A or/and B" may include all possible combinations of the items listed together. For example, "A or B," "at least one of A and B," or "at least one of A or B" may refer to all instances of (1) including at least one A, (2) including at least one B, or (3) including both at least one A and at least one B.

As used herein, expressions such as "first" or "second" as used herein may modify various elements regardless of order and/or importance, and are used only to distinguish one element from another element, and do not limit the elements. For example, the first user device and the second user device may represent different user device regardless of order or importance. For example, without departing from the scope of the rights described in this document, the first element may be named as the second element, and similarly, the second element may also be renamed as the first element.

It should be understood that the certain element may be directly connected to the other component or may be connected through another component (e.g., a third component) when an element (e.g., first element) is referred to as being "(functionally or communicatively) connected" or "(operatively or communicatively) coupled with/to" or "in contact with (connected to)" another element (e.g., second element). On the other hand, it may be understood that no the other element (e.g., third element) exists between an element and another element when an element (e.g., first element) is referred to as being "directly connected to" or "directly in contact with" another element (e.g., second element).

The expression "configured to" used in this document may be used interchangeably with, for example, "suitable for," "having the capacity to," "designed to," "adapted to," "made to," or "capable of" depending on the situation. The term "configured (or configured to)" may not necessarily mean only "specifically designed to" in hardware. Instead, in some circumstances, the expression "a device configured to" may mean that the device is "capable of" with other devices or parts. For example, the phrase "a processor configured (or configured to perform) A, B, and C" may mean a dedicated processor (e.g., an embedded processor) for performing the corresponding operation, or a generic-purpose processor (e.g., a CPU or an application processor) capable of performing corresponding operations by executing one or more software programs stored in the memory device.

Terms used in this document are used only to describe specific examples, and may not be intended to limit the scope of other examples. The singular expression may include the plural expression unless the context clearly dictates otherwise. Terms used herein, including technical or scientific terms, may have the same meanings as commonly understood by one of ordinary skill in the art described in this document. Among the terms used in this document, terms defined in a general dictionary may be interpreted with the same or similar meaning to the meaning in the context of the related art, and unless explicitly defined herein, they should not be construed in an idealistic or overly formal sense. In some cases, even terms defined in this document cannot be construed to exclude examples of this document.

Each feature of the various examples of the present disclosure may be partially or wholly combined or combined with each other, as those skilled in the art will fully understand, technically various interlocking and driving are possible, and each example may be implemented independently of each other or may be implemented together in a related relationship.

For clarity of interpretation of the present specification, terms used herein will be defined below.

An "image" in the present specification may include not only a single image acquired from an image sensor, but also a plurality of images or videos acquired from one image sensor. In more detail, the image may include a plurality of images or images acquired by a plurality of image sensors.

The "artificial neural network model" of the present specification may be a model trained to perform inference of object detection, object segmentation, image/video reconstruction, image/video enhancement, object tracking, event recognition, event prediction, anomaly detection, density estimation, event search, measurement, and the like. An artificial neural network (ANN) in which the number of hidden layers is increased to implement higher artificial intelligence may be referred to as a deep neural network (DNN).

For example, artificial neural network models may be models such as Bisenet, Shelfnet, Alexnet, Densenet, Efficientnet, EfficientDet, Googlenet, Mnasnet, Mobilenet, Resnet, Shufflenet, Squeezenet, VGG, Yolo, RNN, CNN, DBN, RBM, LSTM, and the like. However, the present disclosure is not limited thereto, and various artificial neural network models trained to infer an object or a position of an object by inputting an image processed from an image signal processor (ISP) may be applied to the present disclosure.

Hereinafter, an example of the present disclosure will be described in detail with reference to the accompanying drawings.

FIG. 1 illustrates an image processing system for an artificial neural network according to an example of the present disclosure.

Referring to FIG. 1, an image processing system 10 for an artificial neural network may include an image signal processor (ISP) 100, a processor 150, and a first memory 300.

In various examples, the image processing system 10 for an artificial neural network may be configured to selectively include or exclude a second memory 400.

In various examples, the image processing system 10 for an artificial neural network may be configured as a system-on-chip (SoC).

The image signal processor (ISP) 100 is an image processing processor and may be operatively connected to a camera module for capturing an image. An image signal processor (ISP) may process an image acquired from an image sensor in various ways according to application fields.

For example, the image signal processor 100 may be configured to demosaicing RAW image data having a Bayer pattern into an RGB color space.

For example, the image signal processor 100 may be configured to process color space conversion from an RGB color space to another color space.

For example, the image signal processor 100 may be configured to process a color correction matrix that corrects color variations of an image according to various optical and electrical characteristic conditions.

For example, the image signal processor 100 may be configured to process gamma correction for adjusting a gamma curve of image data.

For example, the image signal processor 100 may be configured to process noise reduction for reducing noise in an image to reduce image artifacts.

For example, the image signal processor 100 may be configured to process edge enhancement for emphasizing an edge.

For example, the image signal processor 100 may be configured to process motion adaptive noise reduction.

For example, the image signal processor 100 may be configured to process high dynamic range imaging (HDR) of the entire image.

For example, the image signal processor 100 may include processing modules that perform the above-described functions, and each processing module may be pipelined.

However, the image processing function of the image signal processor 100 is not limited to the above-described functions.

The processor 150 may be operatively connected to the image signal processor (ISP) 100, the first memory 300, and the second memory 400. The processor 150 may correspond to a computing device such as a central processing unit (CPU) or an application processor (AP). For example, the processor 150 may be a micro processing unit (MPU) or a micro controller unit (MCU). As another example, the processor 150 may correspond to the image signal processor (ISP) 100.

In various examples, the processor 150 may be implemented in the form of an integrated chip (IC) such as a system on chip (SoC) in which various computing devices such as a neural processing unit (NPU), CPU, and GPU are integrated.

In various examples, the processor 150 may operate as a computing device of an advanced driver assistance systems (ADAS), and may also operate as a computing device of various object recognition application systems.

In various examples, the processor 150 may be implemented in the form of an integrated chip in which various computing devices such as an ISP that receive a Bayer pattern and output an RGB input video (image) or data converted into a YUV input and a CPU are integrated.

In various examples, when processor 150 is or is configured to include a neural processing unit (NPU), the processor 150 may have computing power capable of processing the artificial neural network model (ANN) in real time. In other words, since the artificial neural network model (ANN) has a data-intensive computational characteristic, the processor 150 may be configured to include an NPU for inference operations of thirty frames per second or more. However, examples of the present disclosure are not limited to the NPU.

The first memory 300 is a memory mounted on a semiconductor die and may be a memory for caching or storing data processed in the image processing system 10 for an artificial neural network. The first memory 300 may include one of memories such as ROM, SRAM, DRAM, resistive RAM, magneto-resistive RAM, phase-change RAM, ferroelectric RAM, flash memory, and HBM. The first memory 300 may include at least one memory unit. The first memory 300 may be configured as a homogeneous memory unit or a heterogeneous memory unit.

In various examples, the first memory 300 may be configured as an internal memory or an on-chip memory.

The second memory 400 may include one of ROM, SRAM, DRAM, resistive RAM, magneto-resistive RAM, phase-change RAM, ferroelectric RAM, flash memory, and HBM. The second memory 400 may include at least one memory unit. The second memory 400 may be configured as a homogeneous memory unit or a heterogeneous memory unit.

In various examples, the second memory 400 may be configured as an internal memory or an on-chip memory.

The processor 150, the image signal processor 100, the first memory 300, and the second memory 400 of the image processing system 10 for an artificial neural network may be electrically connected to communicate with each other.

Hereinafter, a representative function of the image processing system for an artificial neural network according to the present disclosure will be described in detail.

Figure 2:
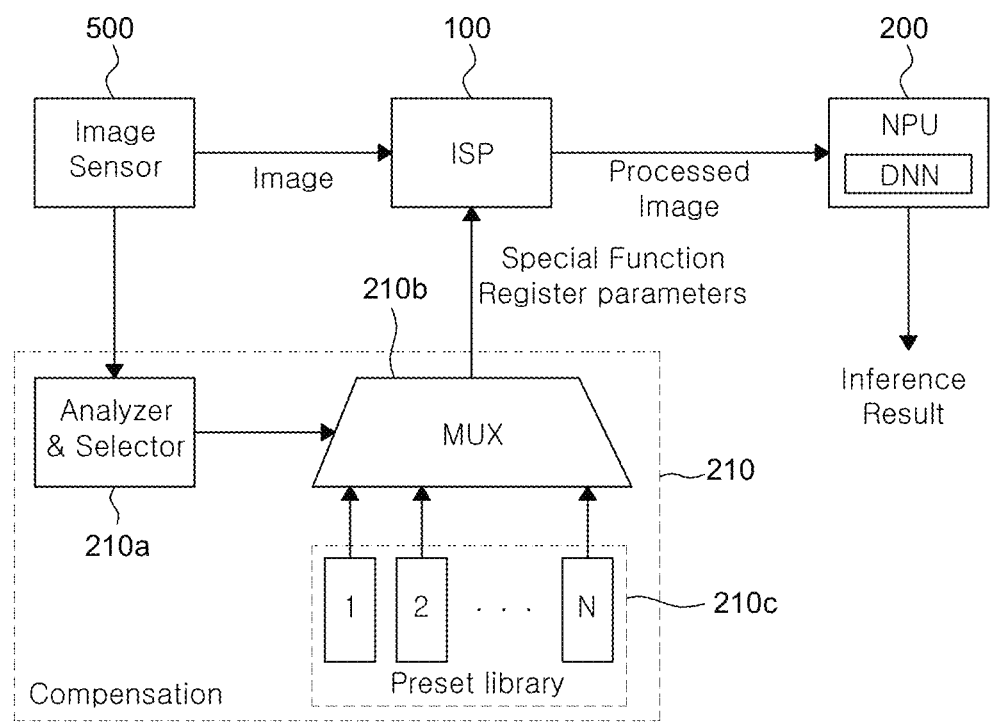
FIGS. 2 and 3 are schematic conceptual diagrams illustrating functions performed by an image processing system for an artificial neural network according to an example of the present disclosure.
Figure 3:
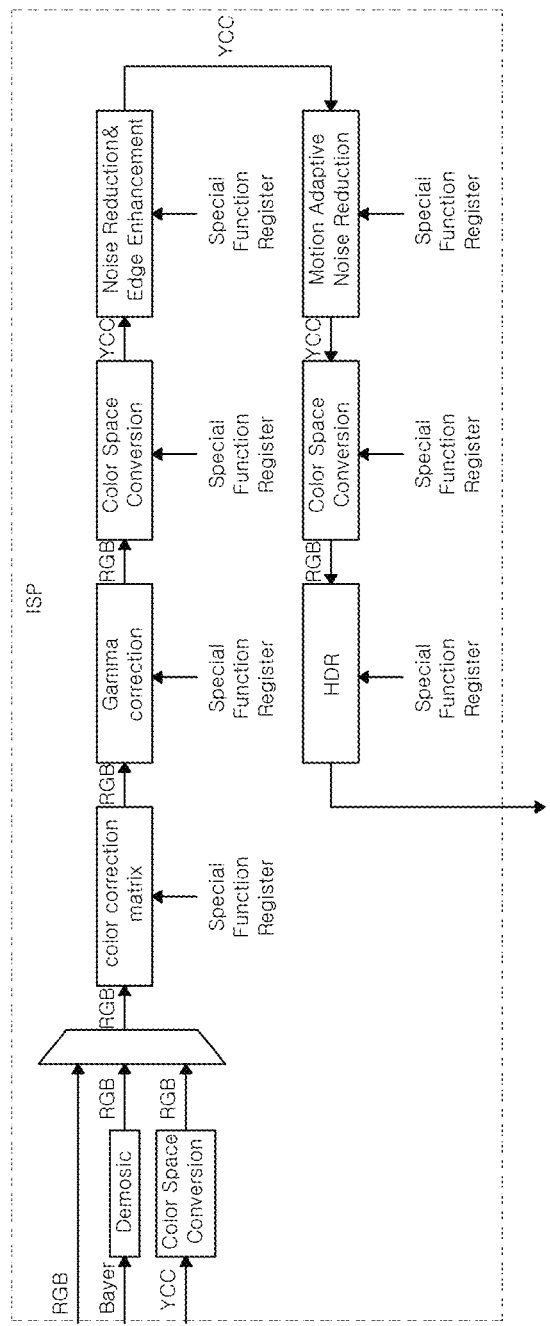

FIG. 2 illustrates functions performed by an image processing system for an artificial neural network according to an example of the present disclosure, and FIG. 3 illustrates an image signal processor according to an example of the present disclosure.

Referring to FIG. 2, the image processing system 10 for artificial neural networks according to an example of the present disclosure may be configured to include at least a compensation unit 210.

The image processing system 10 for an artificial neural network according to an example of the present disclosure may be configured to receive an image from an image sensor 500. However, it is not limited thereto, and the image processing system 10 for an artificial neural network may be configured to further include the image sensor 500.

The image processing system 10 for an artificial neural network according to an example of the present disclosure may be configured to provide a control signal to the image signal processor 100. However, it is not limited thereto, and the image processing system 10 for an artificial neural network may be configured to further include the image signal processor 100.

The image processing system 10 for an artificial neural network according to an example of the present disclosure may be configured to provide a processed image for an artificial neural network to the processor 150. However, it is not limited thereto, and the image processing system 10 for an artificial neural network may be configured to further include a processor 150.

The image processing system 10 for an artificial neural network according to an example of the present disclosure includes a compensation unit 210, and may be configured to further include at least one of an image sensor 500, an image signal processor 100, and a processor 150.

The compensation unit 210 of the image processing system 10 for an artificial neural network according to an example of the present disclosure may be configured to communicate with the image sensor 500 and/or the image signal processor 100, respectively.

The compensation unit 210 may be configured to analyze the image to be inferred by the processor 150 to control the image signal processor 100.

Specifically, the analysis unit 210a of the compensation unit 210 may be configured to store previously analyzed inference accuracy profile information of the artificial neural network model (ANN) capable of improving the inference accuracy of the artificial neural network model (ANN) processed by the processor 150.

The compensation unit 210 may be configured as a separate processor. Alternatively, the compensation unit 210 may be configured to be included in the processor 150. Alternatively, the compensation unit 210 may be configured to be included in the image signal processor 100.

The compensation unit 210 may be configured to include an analysis unit 210a, a multiplexer unit 210b, and a preset library 210c.

The analysis unit 210a may be configured to analyze characteristic data of an image obtained from the image sensor 500. The analysis unit 210a may be configured to select an inference accuracy profile capable of improving the inference accuracy of the artificial neural network model (ANN) from the preset library 210c based on the characteristic data of the analyzed image.

The preset library 210c may be configured to store a plurality of setting values for controlling the image signal processor 100. The image signal processor 100 may be configured to receive a specific setting value and process the image to improve the inference accuracy of the image to be processed by the processor 150. The preset library 210c may be controlled by the multiplexer unit 210b. The preset library 210c may be configured to provide a set value selected in response to the selection signal of the analysis unit 210a to the image signal processor 100.

The multiplexer unit 210b may be configured to receive the characteristic data analyzed by the analysis unit 210a and select a control value to be provided to the image signal processor 100.

Hereinafter, the analysis unit 210a will be described in detail. The analysis unit 210a may be configured to analyze characteristic data of an image to be processed by the processor 150 and compare the analysis result with an inference accuracy profile of an artificial neural network model (ANN).

That is, the inference accuracy profile according to an example of the present disclosure may refer to an inference accuracy profile of a specific artificial neural network model (ANN). The unit of inference accuracy of the artificial neural network model (ANN) may vary according to an application of the artificial neural network model (ANN).

In other words, the inference accuracy profile may mean an object detection rate or an image classification rate of an artificial neural network model (ANN) that varies according to a change in data characteristics of an image. The object detection rate may be expressed as mean average precision (mAP) (%).

In other words, the inference accuracy profile may refer to information obtained by analyzing the tendency of a change in inference accuracy of a specific artificial neural network model (ANN) processed by the processor 150 according to a change in data characteristics of an image input to the processor 150.

In other words, the inference accuracy profile may refer to information analyzed whether a specific artificial neural network model (ANN) can improve inference accuracy when an image has characteristic data of a certain tendency.

It should also be noted that the inference accuracy of an artificial neural network model (ANN) may vary depending on the undergoing weights being trained or the weights for which training has been completed.

For example, a specific artificial neural network model can be machine-learned on a training dataset consisting of a thousand images classified into a hundred classes. In this case, the trained weights of the artificial neural network model may vary according to the change in the characteristic data of each image of the dataset.

In other words, the trained artificial neural network model can have high accuracy when inferring images similar to the trained dataset.

In other words, when the trained artificial neural network model is trained on a dataset consisting of dark images, the inference accuracy of dark images can be improved.

In other words, when the trained artificial neural network model is trained on a dataset consisting of bright images, the inference accuracy of bright images can be improved.

In other words, when the trained artificial neural network model is trained on a dataset consisting of sharp images, the inference accuracy of sharp images can be improved.

In other words, when the trained artificial neural network model is trained on a dataset consisting of blurred images, the inference accuracy of blurred images can be improved.

That is, the inference accuracy of the artificial neural network model (ANN) is affected by the similarity between the image characteristic data of the training dataset and the characteristics of the image to be inferred. The reason for this tendency is that artificial neural network model (ANN) are designed to infer images similar to the trained images well.

That is, the compensation unit 210 may improve the inference accuracy of the trained artificial neural network model by providing a setting value for controlling image processing to the image signal processor 100.

The analysis unit 210a may be configured to utilize the inference accuracy profile of the trained artificial neural network model.

Here, the inference accuracy profile of the artificial neural network model may refer to a profile obtained by analyzing the inference accuracy characteristics of the artificial neural network model. That is, the inference accuracy profile of the artificial neural network model includes the inference accuracy characteristics of the previously analyzed artificial neural network model.

When the artificial neural network model (ANN) to be processed by the processor 150 is determined, an inference accuracy profile of the artificial neural network model (ANN) may be selected. Through the selection of the inference accuracy profile, the inference accuracy change data of the artificial neural network model (ANN) according to the data characteristic change of the image may be generated. The selection of the inference accuracy profile will be described later with reference to FIGS. 6A-6C, 7A-7C, and 8A-8D.

For example, the analysis unit 210a may infer data such as a brightness level or a noise level of a training image dataset of the artificial neural network model (ANN) through selection of an inference accuracy profile of the artificial neural network model (ANN). Accordingly, how the image signal processor 100 image-processes the image obtained from the corresponding image sensor 500, to determine whether the accuracy of the image inferred by the processor 150 is improved.

Accordingly, the compensation unit 210 may provide the control value of the image signal processor 100 for processing the image to the image signal processor 100. The control value may be referred to as a special function register parameter. The special function register parameter (SFR parameter) may mean a value for controlling each processing module included in the image signal processor 100. The control value may be provided in the form of a preset.

That is, the compensation unit 210 may provide one of a plurality of presets of special function register parameters (SFR presets) corresponding to the inference accuracy profile of the artificial neural network model (ANN) to be processed by the processor 150 to the image signal processor (ISP) 100. The special function register parameter may be referred to as an image correction parameter.

In other words, the compensation unit 210 may provide the image signal processor 100 with a preset of a special function register parameter that determines the preprocessing degree of the image for each image to be processed by the processor 150.

The image signal processor 100 may pre-process the image based on the image correction parameter provided by the compensation unit 210.

Referring to FIG. 3, the image signal processor 100 may be configured to include a plurality of processing modules having a pipeline structure. Each processing module may be configured to perform image processing of a specific function. An image correction parameter, which is a special function register parameter, may be input to each processing module.

The process of image processing by the image signal processor 100 may be performed in the order shown in FIG. 3. For example, the image signal processor 100 receives converted RGB image data and performs an image processing function of each processing module. Each module may process an image based on the image correction parameter provided by the compensation unit 210. The image signal processor 100 may transmit the processed image to the processor 150. Here, since the pre-processed image is image-processed based on the inference accuracy profile of the artificial neural network model (ANN) to be processed by the processor 150, the inference accuracy may be improved.

In various examples, depending on the type of the image signal processor 100, additional functions other than image processing described in each processing module may be performed, or some functions may be deleted or integrated.

Again, referring to FIG. 2, the processor 150 may input the pre-processed image into an artificial neural network model (ANN) to perform inference such as image classification or object recognition.

In this way, in the artificial neural network model that uses the image processed based on the image correction parameter as an input, inference accuracy can be improved compared to the conventional art.

Hereinafter, a series of processes for controlling the image signal processor 100 using the compensation unit 210 will be described in detail with reference to FIGS. 4, 5, 6A-6C, 7A-7C, and 8A-8D.

Figure 4:
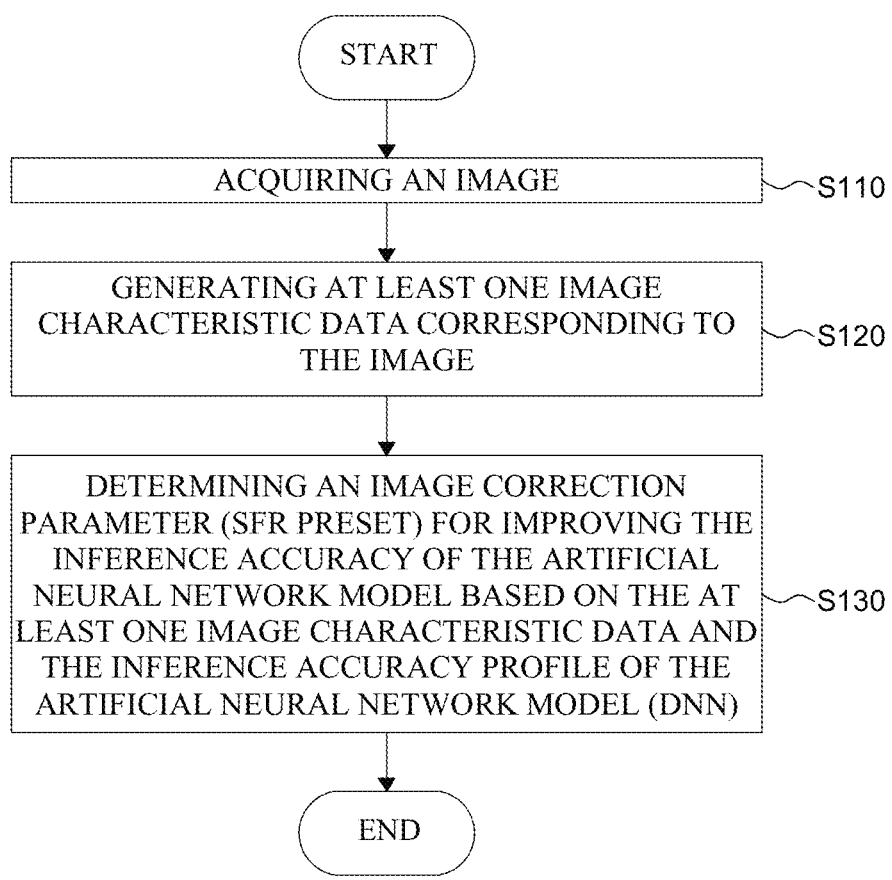
FIG. 4 is a flowchart of a method for controlling an image signal processor according to an example of the present disclosure.

FIG. 4 illustrates a method for controlling an image signal processor according to an example of the present disclosure.

Referring to FIG. 4, the compensation unit 210 may acquire an image (S110). For example, the compensation unit 210 may acquire an image provided by the image sensor 500 or receive an image from an external device through a communication interface (not shown). Here, the image sensor 500 may be a sensor including a Bayer filter. In this case, the image sensor 500 may perform color space conversion of raw image data having a Bayer pattern into RGB, YUV, HSV, YCBCR, or the like.

Referring to FIG. 4, the compensation unit 210 may generate at least one image characteristic data corresponding to the image (S120). Specifically, the analysis unit 210a of the compensation unit 200 may extract at least one of a histogram, a maximum value, a minimum value, a mean value, a standard deviation value, a sum of RGB values, a signal-to-noise ratio (SNR), frequency content, and edge content of each channel of the image and may analyze the image characteristic data of the corresponding image, thereby generating the characteristic data.

That is, the analysis unit 210a may analyze various image characteristic data that may be related to inference accuracy among characteristics of an image to be input to the artificial neural network model (ANN).

Meanwhile, in order to extract various image characteristic data, the analysis unit 210a may include an operation unit capable of performing at least one operation among histogram, minimum, maximum, summation, average, mean, standard deviation, convolution, and Fourier-transform operations capable of analyzing the above-described image characteristic data.

For example, the analysis unit 210a may be configured to include a processor configured to process the operations. For example, the analysis unit 210a may be configured to utilize some module of the image signal processor 100 to process the operations. For example, the analysis unit 210a may be configured to process the operations using an application specific integrated circuit, an application processor, a central processing unit, a graphic processing unit, a micro processing unit, and the like.

After step S120, the compensation unit 210 may determine an image correction parameter (SFR preset) for improving the inference accuracy of the artificial neural network model based on at least one image characteristic data and the inference accuracy profile of the artificial neural network model (S130).

Specifically, the compensation unit 210 may receive a profile in which the change in inference accuracy of the artificial neural network model (ANN) to be processed by the processor 150 is analyzed. Here, the term "inference accuracy change" refers to the inference accuracy of an artificial neural network model (ANN) that changes whenever the level of at least one image characteristic gradually changes, based on at least one image characteristic among brightness, noise, blurriness level, contrast ratio, and color temperature of the image.

For example, an artificial neural network model (ANN) may be a model to be trained to perform inference such as image classification, object detection, object segmentation, object tracking, event recognition, event prediction, anomaly detection, density estimation, measurement, and the like.

Here, in order to implement an accurate operation according to an example of the present disclosure, the artificial neural network model (ANN) may be a trained model. Alternatively, the artificial neural network model (ANN) may be a model that has been trained to a level that has achieved more than a threshold inference accuracy. If additional training is provided to the neural network model, the inference accuracy profile may be changed. Accordingly, the inference accuracy profile selection of the compensation unit 210 may be performed as the trained artificial neural network model is provided.

Hereinafter, an analysis method of the inference accuracy profile of the artificial neural network model to be utilized by the compensation unit 210 will be described. The compensation unit 210 may be provided with an inference accuracy profile of the previously analyzed artificial neural network model. Here, the inference accuracy profile of the artificial neural network model may be provided corresponding to the artificial neural network model to be processed by the processor 150.

Hereinafter, mean average precision (mAP) is used as an example for analyzing the inference accuracy profile of an artificial neural network model.

The inference accuracy profile analysis may be performed after the artificial neural network model (ANN) to be inferred by the processor 150 is determined. The selection of the inference accuracy profile will be described later with reference to FIGS. 6A-6C, 7A-7C, and 8A-8D.

For example, the compensation unit 210 may be configured to analyze the image characteristic data to be processed by the processor 150.

The compensation unit 210 may be configured to be provided with an inference accuracy profile of the analyzed artificial neural network model (ANN).

The compensation unit 210 may be configured to compare the provided inference accuracy profile with the image characteristic data to set an image correction parameter value by which the inference accuracy of the image signal processor 100 can be improved.

The compensation unit 210 may be configured to include a library 210c including a plurality of image correction parameter presets corresponding to the analyzed inference accuracy profile and image characteristic data.

That is, the compensation unit 210 may selectively determine an image correction parameter that determines the degree of preprocessing of an image input to the artificial neural network based on the inference accuracy profile and the analyzed image characteristic data. Here, the image correction parameter (SFR preset) is a parameter to be provided to the image signal processor 100 and may correspond to a value of a special function register of the image signal processor 100.

For example, the image correction parameter (SFR preset) may be defined as a special function register value that can be provided to the image signal processor 100 as shown in Table 1 below. The preset library 210c as shown in Table 1 may be different according to the type and identification information of the image signal processor 100, and the different preset library 210c may be stored in the compensation unit 200 or a separate memory. For example, the preset library 210c may be stored in the first memory 300. However, it is not limited thereto, and the preset library 210c may be stored in a memory inside the compensation unit 210.

TABLE 1

| SFR parameter | Description | Preset #1 | Preset #2 | ... | Preset #N |
|---|---|---|---|---|---|
| Demosic | Enable: 0, 1 | 1 | 0 | | 1 |
| Color Space Conversion | Enable: 0, 1 | 1 | 0 | | 0 |
| Color Correction Matrix | Enable: 0, 1 | 1 | 0 | | 1 |
| | Matrix coefficients: x, y∈{0, 2} | {0, 0} | {2, 2} | | {1, 2} |
| | RGB Offset: x∈{R, G, B} | {0, 0, 0} | {10, 10, 10} | | {90, 90, 90} |
| Gamma Correction | Enable: 0, 1 | 1 | 0 | | 1 |
| | Interpolate LUT values | "A" LUT | "B" LUT | | "N" LUT |
| Nosie Reduction & Edge Enhancement | Enable: 0, 1 | 1 | 0 | | 1 |
| | Enable noise reduction: 0, 1 | 1 | 0 | | 1 |
| | Noise threshold: 0, 1, 2, 3, 4 | 1 | 2 | | 3 |
| | Enable edge enhancement: 0, 1 | 1 | 0 | | 1 |
| | Enhance strength: 0, 1, 2, 3, 4 | 1 | 0 | | 2 |
| Motion Adaptive Nosie Reduction | Enable: 0, 1 | 1 | 0 | | 1 |
| HDR | Enable: 0, 1 | 1 | 0 | | 1 |

The compensation unit 210 may determine an optimal image correction parameter from the N image correction parameters (SFR preset) shown in Table 1 based on the image characteristic data and the inference accuracy profile of the artificial neural network model (ANN).

The compensation unit 210 transmits the determined optimal image correction parameter (SFR preset) to the image signal processor 100. Accordingly, the processor 150 may receive a processed image from the image signal processor 100 based on the image correction parameter. For example, the processor 150 may output an object inference result by inputting a processed image to an artificial neural network model (ANN) trained to infer an object.

In various examples, the processor 150 may be provided with a weight value of the artificial neural network model (ANN) together with a processed image for an inference operation.

In various examples, the compensation unit 210 may determine an image correction parameter for improving the inference accuracy of the plurality of artificial neural network models based on the inference accuracy profiles of the plurality of artificial neural network models stored in a specific memory. For example, the specific memory may be the first memory 300 or the second memory 400. Specifically, even an artificial neural network model having the same layer structure may have different inference accuracy depending on the training image dataset. Accordingly, when a plurality of artificial neural network models exists, the compensation unit 210 may select individual image correction parameters for improving inference accuracy for each of the plurality of artificial neural network models.

Here, the first artificial neural network model may be an image classification model. The second artificial neural network model may be an object recognition model. The third artificial neural network model may be an object segmentation model. The weights of each artificial neural network model may be different from each other according to training data. Accordingly, the inference accuracy profile of each artificial neural network model may be different from each other. Therefore, the inference accuracy profile of each artificial neural network model may be analyzed differently. The inference accuracy profile of each analyzed artificial neural network model may be provided to the compensation unit 210, respectively. Accordingly, the compensation unit 210 may be configured to receive or store the inference accuracy profile of the at least one artificial neural network model.

Hereinafter, a method of selecting an inference accuracy profile of an artificial neural network model to determine an optimal parameter will be described in detail with reference to FIG. 5.

Figure 5:
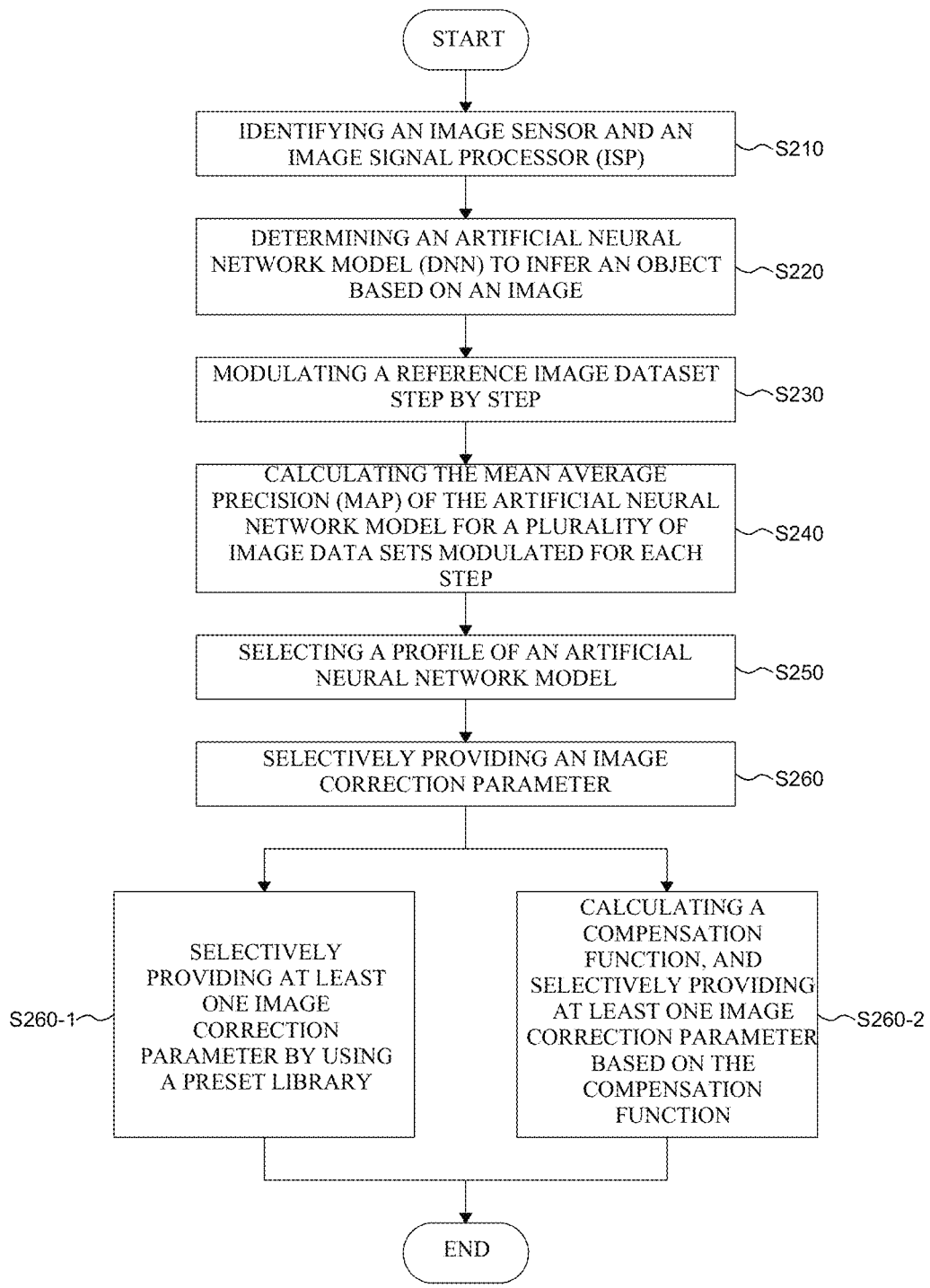
FIG. 5 is a detailed flowchart of a method for controlling an image signal processor according to an example of the present disclosure.

FIG. 5 illustrates a method for controlling an image signal processor according to an example of the present disclosure.

Referring to FIG. 5, the compensation unit 210 may identify the image sensor 500 and the image signal processor 100 (S210). Specifically, as the image sensor 500 and the image signal processor 100 have different characteristics of processing image data for each type, the processor 150 may identify the two devices prior to selecting an image correction parameter (SFR preset) of the image signal processor 100. However, the present disclosure is not limited to device identification, and the device identification step may be omitted.

After step S210, the processor 150 may determine an artificial neural network model (ANN) to infer an object based on the image S220. Specifically, the first memory 300 may store a plurality of artificial neural network models, and a user may select one artificial neural network model among them.

After step S220, the processor 150 may step-by-step modulate the reference image dataset of the artificial neural network model which is determined in the previous step (S230). Here, the reference image dataset may be, for example, tens of thousands of validation image datasets for performance evaluation of an artificial neural network model.

The processor 150 may modulate the properties of the image step by step based on at least one image characteristic of brightness, noise, blurriness level, contrast ratio, and color temperature of the image.

After step S230, the processor 150 may calculate the mean average precision (mAP) of the artificial neural network model for a plurality of image data sets modulated for each step (S240), and a profile of the artificial neural network model may be selected based on the calculation result (S250).

FIGS. 6A-6C, 7A-7C, and 8A-8D are for explaining a method of selecting a profile of an artificial neural network model based on an image characteristic according to an example of the present disclosure.

In relation to FIGS. 6A-6C, 7A-7C, and 8A-8D, it should be understood that some processes (e.g., creating a modulated image dataset, etc.) for selecting the reference image dataset of the artificial neural network model and analyzing the profile are performed by the analysis system (not shown) or the processor 150 included in the image processing system 10 for the artificial neural network. In addition, the profile analysis task may be difficult to process in real time because it is necessary to infer hundreds of thousands of analysis images for a profile. Further, it may also require memory to store hundreds of thousands of analysis images for a profile. Therefore, it may be efficient to separately perform the profile analysis work in advance and separately utilize only the analyzed profile result.

Figure 6A:
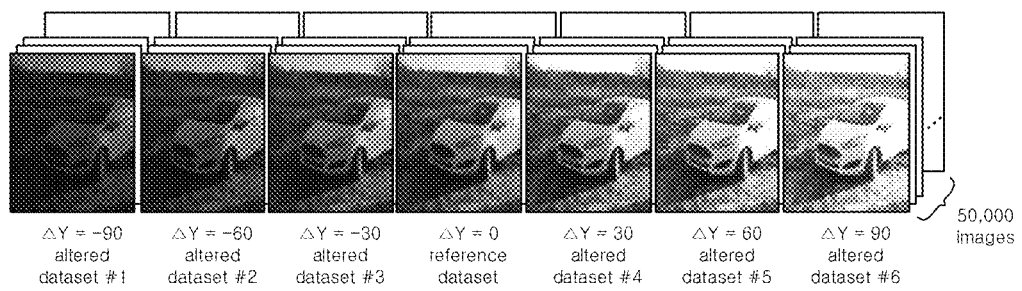
FIGS. 6A-6C, 7A-7C, and 8A-8D are diagrams for explaining a method of selecting an inference accuracy profile of an artificial neural network model based on image characteristics according to an example of the present disclosure.
Figure 6B:
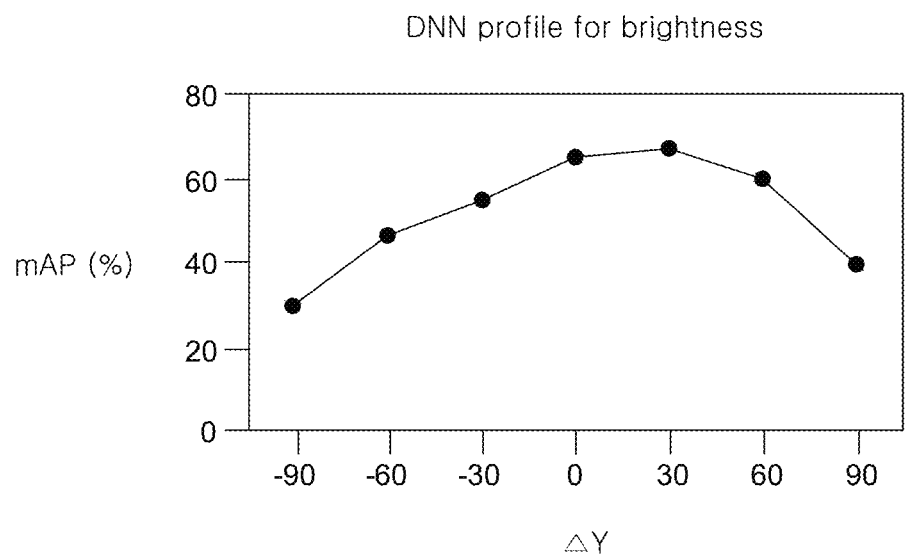
Figure 6C:
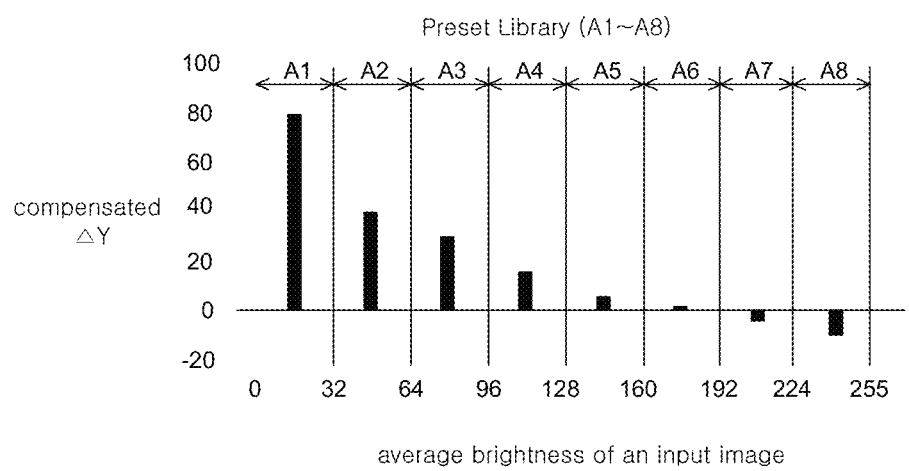

FIGS. 6A to 6C analyze the inference accuracy profile of the artificial neural network model with the brightness of the image. Referring to FIG. 6A, a reference image dataset for generating a profile may be prepared. As usable datasets, publicly available standard datasets or datasets created for training specific functions may be used.

For example, fifty thousand of images that can evaluate artificial neural network inferences can be used as a dataset. For profile generation, six altered image datasets may be generated by modulating the average brightness of an image step by step based on a reference image dataset. One modulated image dataset includes fifty thousand images with different brightness. Therefore, the six modulated data sets include a total of 300,000 images. In addition, if the reference image dataset is included, an image dataset for profile analysis of 350,000 images having a total of seven levels of brightness can be prepared.

For example, by varying the brightness value Y of the reference image of the YCbCr color space in the reference image dataset in a unit of thirty gray levels, modulated image datasets in which the image brightness value Y having six steps may be generated. Here, the unit of change of the brightness value is not limited thereto, and the unit of change of the brightness value may be set by the user.

The analysis system may input each image dataset into an artificial neural network model (ANN) to profile the mean average precision (mAP) of the artificial neural network model according to an average brightness change. Here, the image dataset may include both modulated image datasets and a reference image dataset. Profile analysis may be performed in a separate system or processor 150.

Referring to FIG. 6B, as a result of profiling, it can be seen that the artificial neural network model (ANN) has the highest mAP when the average brightness of the reference image dataset is increased by thirty levels ($\Delta Y=30$), and the mAP is the lowest when the average brightness is decreased by ninety levels ($\Delta Y=-90$).

That is, referring to the profile result, the inference accuracy characteristic of the artificial neural network model may be analyzed based on the difference in inference accuracy between the reference image dataset and the modulated image dataset. For example, referring to the profile of FIG. 6B, it may be determined that a brighter image is used as the training image dataset of the artificial neural network model. For example, the artificial neural network model to be processed by the processor 150 may be analyzed to have the highest inference accuracy in an image that is brighter by thirty levels or more. That is, the average brightness value of the fourth modulation data set ($\Delta Y=30$) may be determined as an optimal value. Accordingly, the compensation unit 210 may control the image signal processor 100 so that the average brightness value of the image to be processed by the processor 150 becomes similar to the average brightness value of the fourth modulation data set ($\Delta Y=30$).

Accordingly, the compensation unit 210 may be configured to control the image signal processor 100 to vary the brightness of the image input to the artificial neural network model (ANN) according to the inference accuracy characteristics of the artificial neural network model. Accordingly, the compensation unit 210 may improve the inference accuracy of the artificial neural network model.

Referring to FIG. 6C, the compensation unit 210 may select an image correction parameter (SFR preset) of the image signal processor 100 using the preset library 210c.

Specifically, the compensation unit 210 may calculate an average brightness of an input image based on the image characteristic data. The compensation unit 210 may select an image correction parameter preset to be applied to the corresponding image from a preset library 210c according to the calculated average brightness of the image.

For example, the first brightness correction preset A1 may imply that, when the average brightness level of the input image is 0 to 32, the image signal processor 100 performs correction to increase the average brightness of the image by eighty levels ($\Delta Y=80$). As another example, the eighth brightness correction preset A8 may imply that, when the average brightness level of the input image is 224 to 255, the image signal processor 100 performs correction to decrease the average brightness of the image by ten levels ($\Delta Y=-10$).

As such, the compensation unit 210 may determine an image correction parameter for improving the inference accuracy of the artificial neural network model by considering the inference accuracy profile according to (1) the average brightness of the input image and (2) the average brightness of the artificial neural network model. Therefore, the inference accuracy of the artificial neural network model can be improved.

In more detail, the image signal processor 100 may correct the brightness level $\Delta Y$ of the image based on the image correction parameter received from the compensation unit 210. For example, the image signal processor 100 may convert raw image data having a Bayer pattern into a YCbCr color space and then correct the brightness level $\Delta Y$ of the image. Also, the image signal processor 100 converts raw image data having a Bayer pattern into RGB for each pixel. Next, the image signal processor 100 may correct the brightness level of the image to match the YCbCr-based image correction parameter $\Delta Y$ by adjusting the RGB value or the gamma curve value.

Figure 7A:
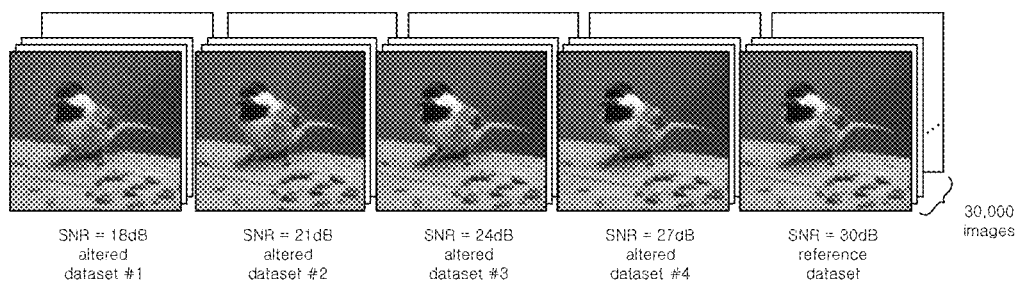
Figure 7B:
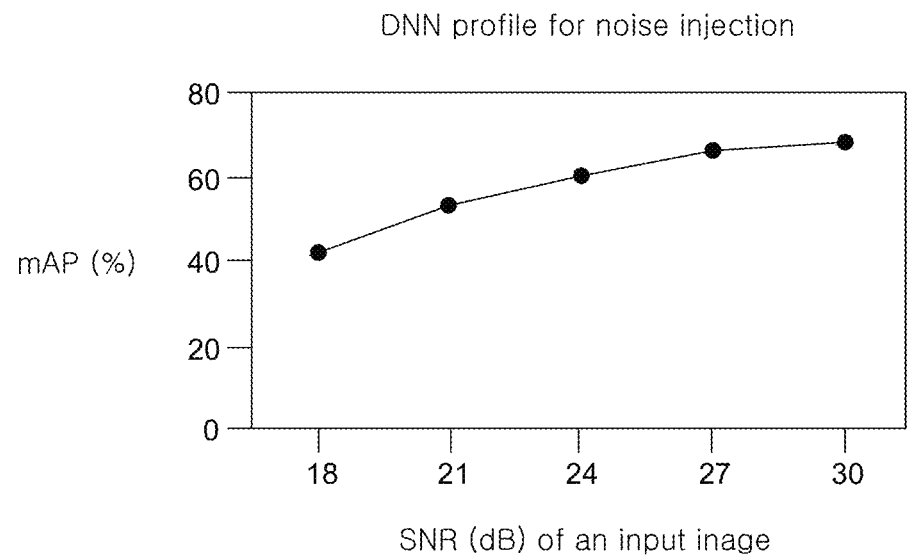
Figure 7C:
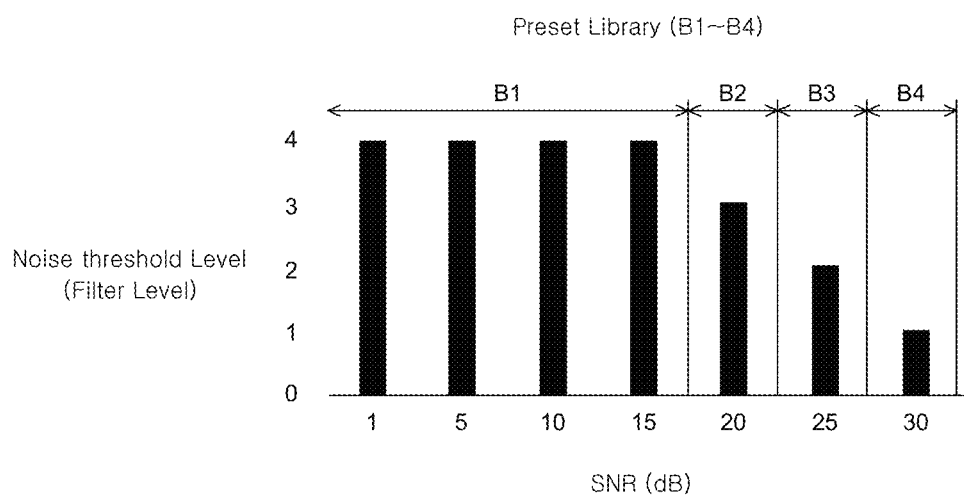

In FIGS. 7A to 7C, an inference accuracy profile of an artificial neural network model (ANN) may be analyzed using image noise. Referring to FIG. 7A, a reference image dataset for generating an inference accuracy profile may be prepared. As usable datasets, publicly available standard datasets or datasets created for training specific functions may be used.

For example, images that can evaluate 30,000 artificial neural network inferences can be used as a dataset. In order to generate an inference accuracy profile, four altered image datasets may be generated by modulating the noise level of an image step by step based on the reference image dataset. One modulated image dataset includes 30,000 images with different noise levels. Therefore, the four modulation data sets include a total of 120,000 images. In addition, if the reference image dataset is included, datasets of 150,000 images for profile analysis having a total of five noise levels can be prepared.

In more detail, the reference image datasets for analyzing the brightness profile and the noise profile may be the same or different from each other.

For example, by adding three decibels (dB) of white noise to the reference image dataset, it is possible to generate four different modulated image datasets subjected to noise processing for each step. Here, the unit of the added noise value is not limited thereto, and the unit of the added noise value may be designated by the user.

The processor 150 may input each modulated image dataset into an artificial neural network model (ANN) to profile a mean average precision (mAP) of the artificial neural network model according to a change in noise. Here, the image dataset may include both modulated image datasets and a reference image dataset.

Referring to FIG. 7B, as a result of profiling, it can be confirmed that the artificial neural network model adds 3 dB of noise to the reference image dataset, and as the signal-to-noise ratio (SNR) value decreases, the mAP decreases.

That is, referring to the result of the inference accuracy profile, the inference accuracy characteristic of the artificial neural network model can be analyzed based on the difference in inference accuracy between the reference image dataset and the modulated image dataset. For example, referring to the inference accuracy profile of FIG. 7B, it may be reckoned that a clear image with low noise is used as the training image dataset of the artificial neural network model. For example, an artificial neural network model (ANN) to be processed by the processor 150 may be analyzed to have the highest inference accuracy in an image having a relatively high signal-to-noise ratio. That is, a value of a signal-to-noise ratio of 30 dB or more may be determined as an optimal value. Accordingly, the compensation unit 210 may control the image signal processor 100 so that the signal-to-noise ratio of the image to be processed by the processor 150 becomes similar to 30 dB.

Accordingly, the compensation unit 210 may be configured to control the image signal processor 100 so that the signal-to-noise ratio of the image input to the artificial neural network model (ANN) can be varied according to the inference accuracy characteristics of the artificial neural network model. Accordingly, the compensation unit 210 may improve the inference accuracy of the artificial neural network model.

Referring to FIG. 7C, the compensation unit 210 may select an image correction parameter (SFR preset) of the image signal processor 100 using the preset library 210c.

Specifically, the compensation unit 210 may calculate a signal-to-noise ratio of the image based on the image characteristic data. The compensation unit 210 may select an image correction parameter preset to be applied to the corresponding image from a preset library according to the calculated signal-to-noise ratio of the image.

For example, the first signal-to-noise ratio preset B1 may imply that the image signal processor 100 processes the noise filter level to level 4 when the average signal-to-noise ratio of the input image is 15 dB or less. As another example, the third signal-to-noise ratio preset B3 may imply that the image signal processor 100 processes the noise filter level as level two when the signal-to-noise ratio of the input image is 25 dB. In this case, as the level of the noise filter increases, the noise correction characteristic may be improved. For example, the noise filter may include a low-pass filter, a smoothing filter, a convolutional filter, and the like, but is not limited thereto. For example, the noise reduction may be performed in the noise reduction and edge enhancement module shown in FIG. 3.

As such, the compensation unit 210 may select an image correction parameter (SFR preset) for improving the inference accuracy of the artificial neural network model and provide it to the image signal processor 100 by considering the inference accuracy profile according to the signal-to-noise ratio of the input image and the signal-to-noise ratio of the artificial neural network model. Therefore, the inference accuracy of the artificial neural network model can be improved.

In more detail, the image signal processor 100 may correct noise in the image based on the image correction parameter received from the compensation unit 210. For example, the image signal processor 100 may correct noise in an image by adjusting a noise threshold value.

Figures 8A, 8B:
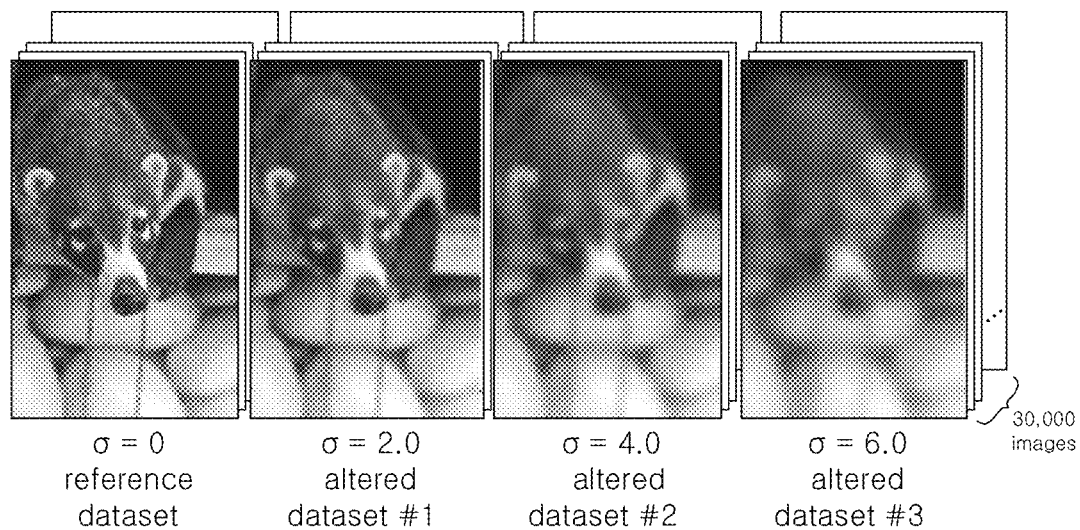

In FIGS. 8A to 8D, the inference accuracy profile of the artificial neural network model (ANN) can be analyzed with the blurriness level of the image. Referring to FIG. 8A, a reference image dataset for generating an inference accuracy profile may be prepared. As usable datasets, publicly available standard datasets or datasets created for training specific functions may be used.

For example, images that can evaluate 30,000 artificial neural network inferences can be used as a dataset. In order to generate an inference accuracy profile, three altered image datasets may be generated by modulating a blurriness level (σ) of an image, step by step, based on a reference image dataset. One modulated image dataset includes 30,000 images with different blurriness levels. Therefore, the three modulated data sets include a total of 90,000 images. In addition, if the reference image dataset is included, datasets of 120,000 images for profile analysis having a total of four blurriness levels can be prepared.

For example, the σ value may be adjusted by applying the Gaussian filter of Equation 1 to the reference image dataset.

$$g_\sigma = (x, y) = \frac{1}{2\pi\sigma^2} e^{-\left(\frac{x^2+y^2}{2\sigma^2}\right)} \quad \text{Equation 1}$$

The processor 150 may generate three modulated image datasets having different blurriness levels by increasing the σ value by 2, based on a blurriness level (σ=0). Here, the unit of change of the blurriness level is not limited thereto, and the unit of change of the blurriness level may be designated by the user.

In other words, the reference image dataset for analyzing the brightness profile, the noise profile, and the blurriness level profile may be the same as or different from each other.

The processor 150 may input each modulated image dataset into an artificial neural network model (ANN) to profile the mAP of the artificial neural network model according to a change in the blurriness level. Here, the image dataset may include both modulated image datasets and a reference image dataset.

Referring to FIG. 8B, as a result of profiling, it can be confirmed that mAP of the artificial neural network model gradually decreases as the blurriness level increases.

That is, referring to the result of the inference accuracy profile, it is possible to analyze the inference accuracy characteristics of the artificial neural network model based on the mAP difference between the reference image dataset and the modulated image dataset. For example, referring to the inference accuracy profile result of FIG. 8B, it can be reckoned that a relatively clear image is used as the training image dataset of the artificial neural network model, and, for example, the artificial neural network model to be processed by the processor 150 may be analyzed to have the highest inference accuracy in a relatively clear image. That is, a value having a σ value of zero may be determined as an optimal value. Accordingly, the compensation unit 210 may select an image correction parameter (SFR preset) for controlling the image signal processor 100 so that the blurriness level σ of the image to be processed by the processor 150 approaches zero.

Accordingly, the compensation unit 210 may be configured to control the image signal processor 100 to vary the blurriness level of the image input to the artificial neural network model (ANN) according to the inference accuracy characteristic of the artificial neural network model. Accordingly, the compensation unit 210 may improve the inference accuracy of the artificial neural network model.

Figure 8C:
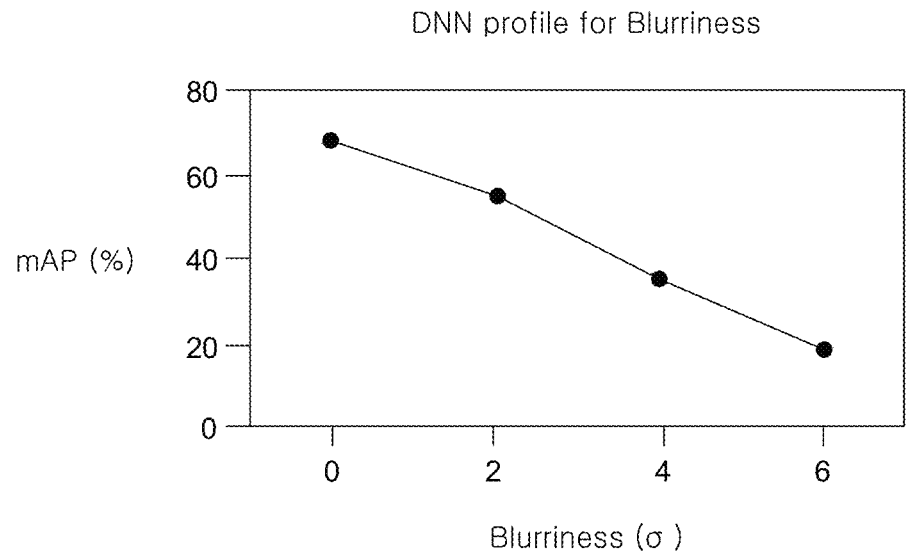

Referring to FIG. 8C, the compensation unit 210 may determine an image correction parameter (SFR preset) of the image signal processor 100 using the preset library 210c.

Specifically, the compensation unit 210 may calculate frequency content of the image based on the image characteristic data. Here, the compensation unit 210 may determine that when the frequency of an image is high, the image is regarded as sharp, and may determine that when the frequency of an image is low, the image is regarded as blurry. The compensation unit 210 may select an image correction parameter preset (SFR preset) to be applied to a corresponding image from a preset library according to the calculated frequency information.

Specifically, the compensation unit 210 may calculate the blurriness level based on the image characteristic data. The compensation unit 210 may map the blurriness level corresponding to the frequency of the image. The compensation unit 210 may selectively determine an image correction parameter to be applied to a corresponding image from a preset library according to the mapped blurriness level.

For example, the first blurring preset C1 may imply that the image signal processor 100 does not perform an edge enhancing function when the blurriness level of the input image is σ=0. As another example, the fourth blurring preset C4 may imply that the image signal processor 100 performs correction corresponding to the edge enhancement level 3 when the blurriness level of the input image is σ=6. In this case, as the level of the edge enhancement filter increases, edge characteristics may be increased.

In this way, the compensation unit 210 may select an image correction parameter for improving mAP of the artificial neural network model and provide it to the image signal processor 100 by considering the profile (mAP change characteristic) according to (1) the blurriness level of the input image and (2) the blurriness level of the artificial neural network model. Therefore, the inference accuracy of the artificial neural network model can be improved.

Figure 8D:
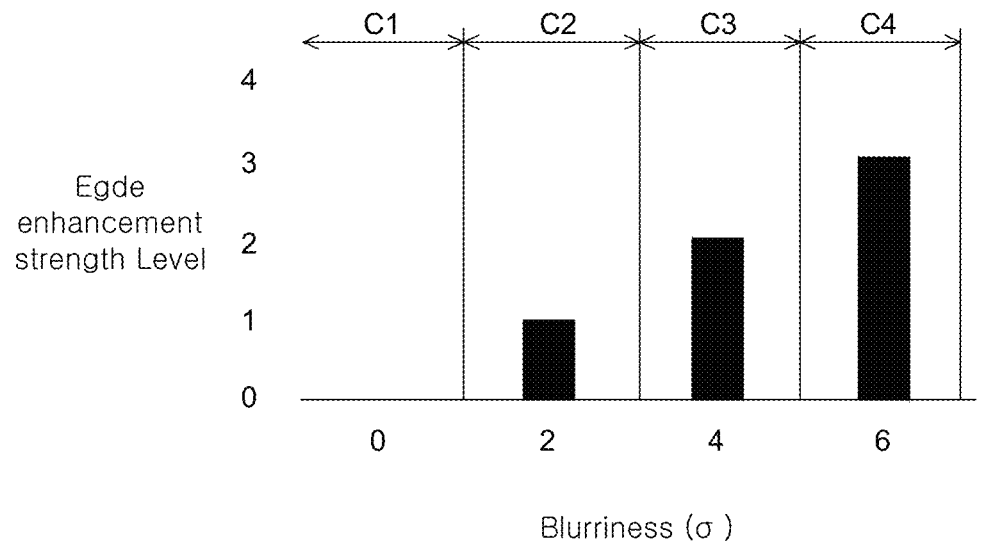

In more detail, the image signal processor 100 may correct the blurriness level of the image based on the image correction parameter received from the compensation unit 210. For example, the image signal processor 100 may perform correction for emphasizing the edge of the image by adjusting the weight of the kernel filter as shown in FIG. 8D. For example, edge enhancement may be performed in the noise reduction and edge enhancement module shown in FIG. 3.

That is, the compensation unit 210 may utilize an inference accuracy profile of an artificial neural network model (ANN) corresponding to at least one image characteristic of brightness, noise, blurriness level, contrast ratio, and color temperature of the image. Accordingly, the compensation unit 210 may selectively provide an appropriate image correction parameter (SFR preset) of the image signal processor 100 (S260).

In various examples of the present disclosure, it is possible to further analyze and reflect additional inference accuracy profiles. For example, additional inference accuracy profiles can be analyzed while modulating the values of certain image characteristics of the dataset.

In various examples, the compensation unit 210 may use two methods to selectively provide an image correction parameter (SFR preset).

As an example, the compensation unit 210 may selectively provide at least one of a plurality of image correction parameter presets by using the preset library 210c as shown in Table 1 above (S260-1). The compensation unit 210 may be configured to analyze the at least one image characteristic data from the image in order to select an optimal image correction parameter. The compensation unit 210 may analyze image characteristic data for each image frame. Alternatively, the compensation unit 210 may analyze the image characteristic data for each of the plurality of image frames.

As another example, the compensation unit 210 may calculate a compensation function capable of selectively determining each image correction parameter of the image signal processor 100, and may selectively provide the image correction parameter based on the compensation function (S260-2). Here, the compensation function may be a function capable of determining an image correction parameter by matching the inference accuracy profile of the artificial neural network model (ANN) with the image characteristic data of the image to be processed by the processor 150. At this time, since the inference accuracy profile of the artificial neural network model (ANN) is different depending on the training image dataset, the compensation unit 210 may derive a plurality of compensation functions corresponding to one artificial neural network model with a plurality of image characteristics, respectively.

In various examples, the image processing system 10 for an artificial neural network may control a capturing parameter of the image sensor 500 to correct a compensation function that determines an image correction parameter. For example, the image processing system 10 for an artificial neural network may control a signal amplification value of the image sensor 500 or control an exposure time (shutter speed), and may correct a compensation function through this.

Hereinafter, an example in which the configuration of the above-described image processing system 10 for an artificial neural network is selectively modified will be described.

FIGS. 9 to 13 respectively illustrate functions performed by an image processing system for an artificial neural network according to various examples of the present disclosure.

Figure 9:
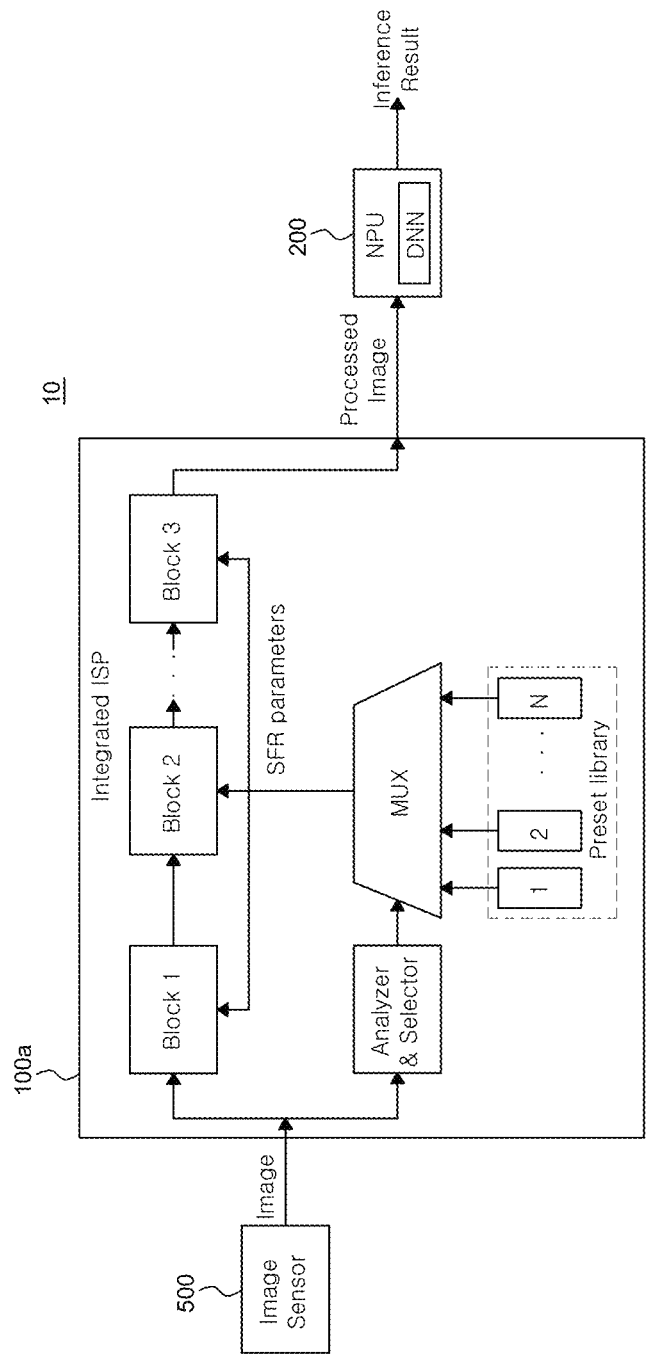
FIGS. 9 to 13 are schematic conceptual diagrams respectively illustrating functions performed by an image processing system for an artificial neural network according to various examples of the present disclosure.

Referring to FIG. 9, the image processing system 10 for an artificial neural network according to an example of the present disclosure may be configured to include a compensation unit 210 in an image signal processor 100a different from that of FIG. 2. That is, the image signal processor 100a may selectively determine an image correction parameter based on image characteristic data analysis and an inference accuracy profile of an artificial neural network model, and may perform image processing described in each processing module.

As such, the image signal processor 100a can determine the image correction parameter by integrating the compensation unit 210, thereby increasing the convenience of using the image processing system 10 for an artificial neural network.

Figure 10:
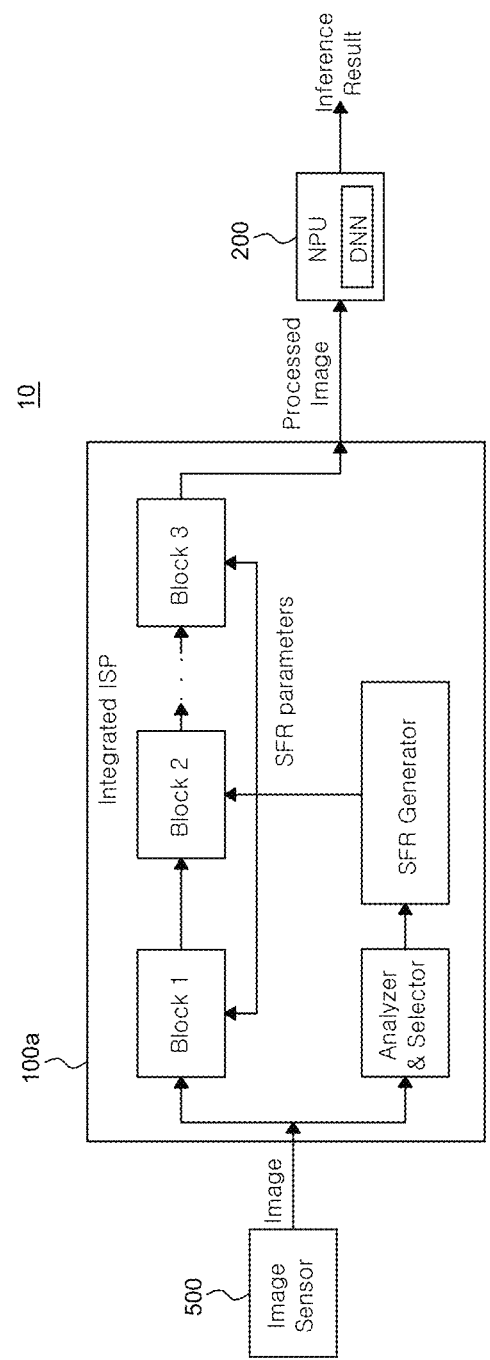

Referring to FIG. 10, the image processing system 10 for an artificial neural network according to an example of the present disclosure may utilize a compensation function to selectively determine an image correction parameter. In the above-mentioned methods, image correction parameters to be determined according to image properties were selected one by one from a preset library. On the other hand, the image signal processor 100a of FIG. 10 may determine an image correction parameter through a compensation function.

The image signal processor 100a may selectively determine an image correction parameter based on a plurality of compensation functions corresponding to each of brightness, noise, blurriness level, contrast ratio, and color temperature of the image.

In various examples, the compensation function may selectively determine an image correction parameter based on a function approximation or a curve fitting algorithm.

In various examples, the compensation function may be implemented as a separate artificial neural network model, and in this case, may be updated based on reinforcement learning.

Figure 11:
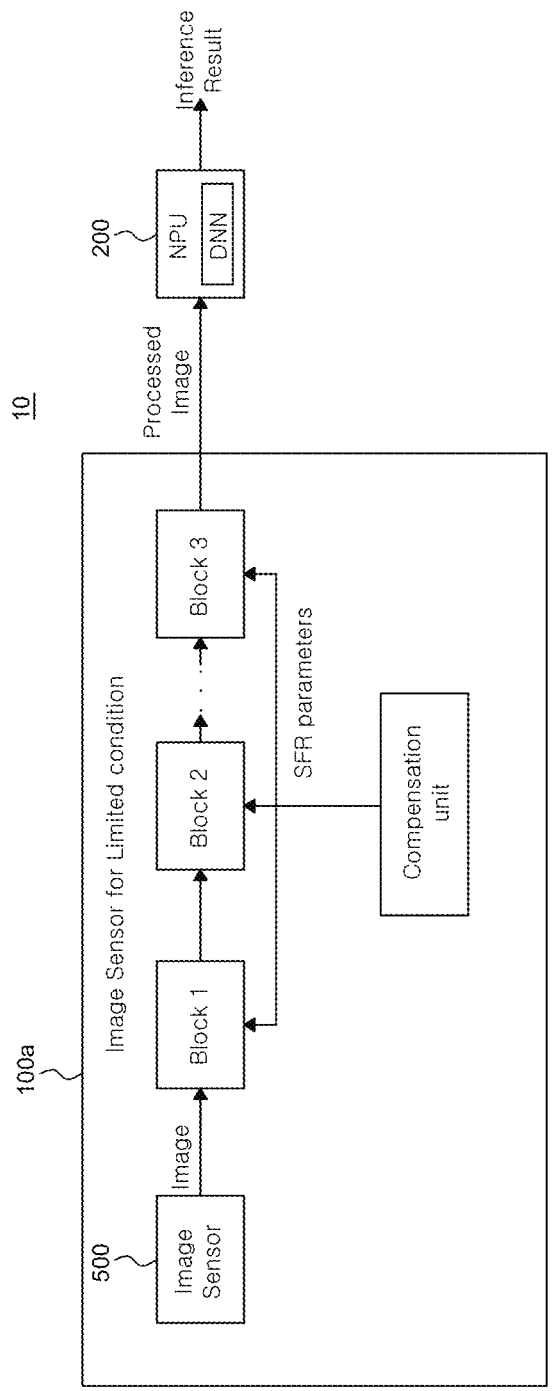

Referring to FIG. 11, when the image processing system 10 for an artificial neural network operates in a specified environment, the image signal processor 100a may fix an image correction parameter. For example, when the image signal processor 100a operates only in a specific environment, a specific time, and a specific location, the image correction parameter may be fixed to an optimized value.

In various examples, the image signal processor 100a may fix an image correction parameter even in a dynamic environment. For example, the image signal processor 100a may calculate an image correction parameter having high probabilistic inference accuracy among a plurality of image correction parameters and designate it as a fixed value.

Figure 12:
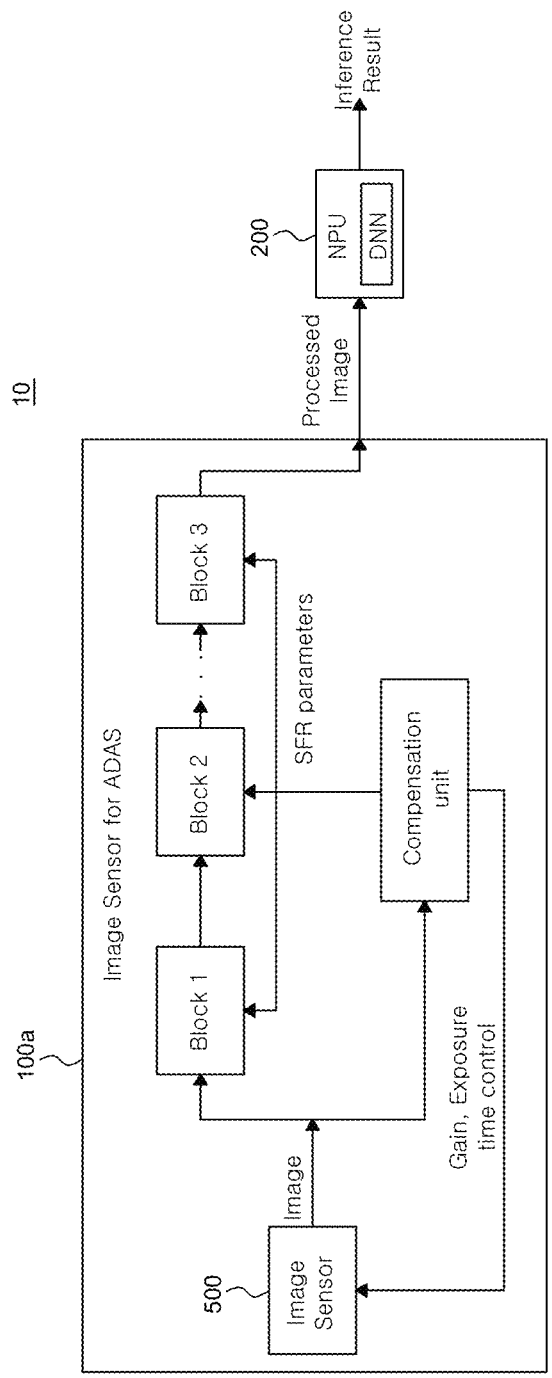

Referring to FIG. 12, the image processing system 10 for an artificial neural network may include an image sensor 500 as it is applied to devices requiring an object recognition function, such as autonomous driving and CCTV. The image signal processor 100a may be configured to control a capturing parameter of the image sensor 500. For example, the image signal processor 100a may control signal amplification of the image sensor 500 or control an exposure time (shutter speed).

Meanwhile, in various examples, the image signal processor (ISP) operates in a preset selecting mode for selectively determining an image correction parameter from a preset library as shown in FIG. 9. Alternatively, as shown in FIG. 10, it may operate in an image correction parameter (SFR) generating mode that selectively determines an image correction parameter using a compensation function.

Figure 13:
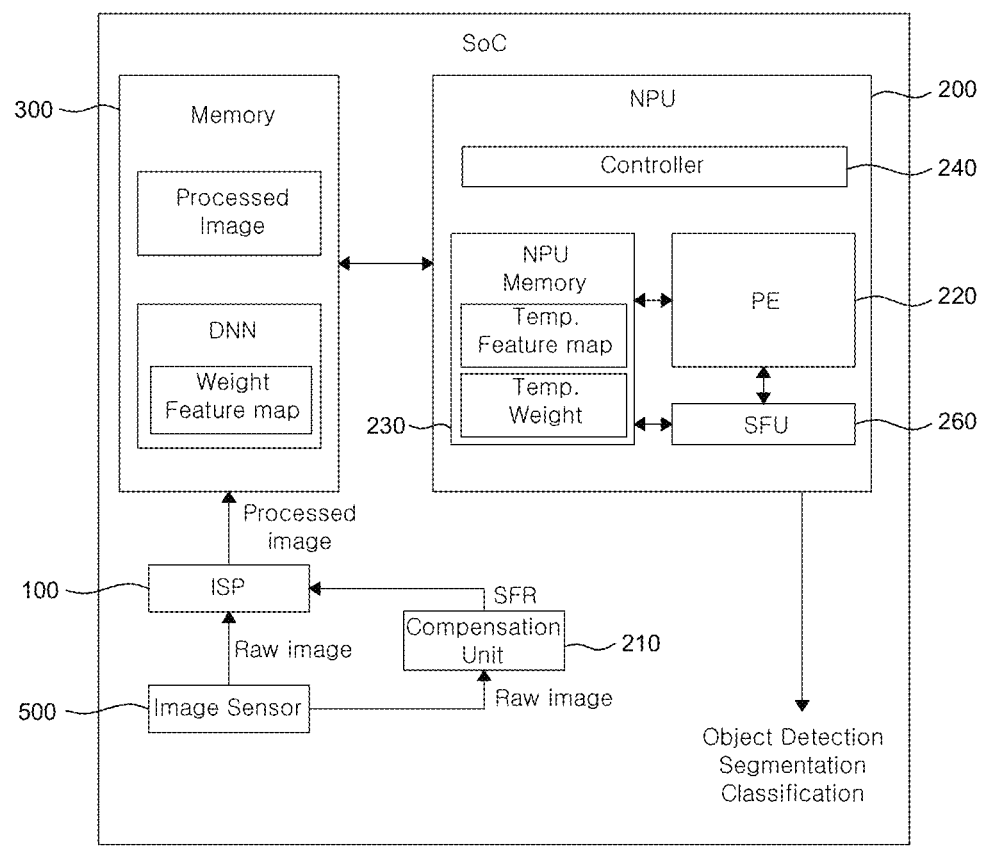

Referring to FIG. 13, the processor 150 of the image processing system 10 for an artificial neural network may be implemented as a neural processing unit (NPU) 200 specialized for inference operation of an artificial neural network model (ANN). That is, the neural processing unit 200 is configured to process a weight value of the artificial neural network model stored in the first memory 300 together with the image processed by the image signal processor 100. Neural processing unit (NPU) 200 may be configured to infer image classification, object recognition or segmentation, and the like from the processed image.

Here, the artificial neural network model refers to a network of artificial neurons that multiplies and adds weights when multiple inputs or stimuli are received, and transforms and transmits a value obtained by adding an additional deviation through an activation function. The artificial neural network model trained in this way can be used to output inference results from input data.

In an example of the present disclosure, the neural processing unit (NPU) 200 may be a semiconductor implemented as an electric/electronic circuit. The electric/electronic circuit may mean including a number of electronic devices (e.g., transistors, capacitors).

Specifically, the neural processing unit (NPU) 200 may include a plurality of processing elements (PE) 220, an NPU internal memory 230, a control unit 240, an NPU interface, and a special function unit (SFU) 260. The SFU 260 may be referred to as a function calculation unit 260. Each of the plurality of processing elements 220, the NPU internal memory 230, the control unit 240, and the function calculation unit 260 may be a semiconductor circuit to which numerous transistors are connected. Accordingly, some of them may be difficult to identify and distinguish with the naked eye, and may be identified only by operation.

For example, arbitrary circuits in the neural processing unit (NPU) 200 of the image processing system 10 for an artificial neural network may be operated in connection with the plurality of processing elements 220, or may be operated in connection with the control unit 240. The control unit 240 may be configured to perform a function of the control unit configured to control the artificial neural network inference operation of the neural processing unit 200.

The plurality of processing elements 220 may perform an operation for the artificial neural network. Specifically, a plurality of processing elements 220 (e.g., PE1, PE2, PE3, . . . PEn, where n is a natural number) configured to calculate the feature map and weight of the artificial neural network model (ANN) may be disposed. For example, the plurality of processing elements 220 may be configured in a (N×M) matrix (where N and M are natural numbers) according to the characteristics of the artificial neural network model (ANN), and thus, (N×M) processing elements may be included.

The plurality of processing elements 220 may perform functions such as addition, multiplication, and accumulation required for artificial neural network operation. In other words, the plurality of processing elements 220 may be configured to perform a multiplication and accumulation (MAC) operation. The plurality of processing elements 220 may be configured to include a MAC operator and/or an arithmetic logic unit (ALU) operator. However, the number and configuration of the plurality of processing elements 220 are not limited thereto.

To elaborate, the plurality of processing elements 220 may optionally further include an additional special function unit to process the additional special function. For example, the at least one processing element may further include a batch-normalization unit, an activation function unit, an interpolation unit, and the like.

Meanwhile, although it has been described in FIG. 13 that the plurality of processing elements 220 are configured in an array form, by replacing a MAC of one processing element, operators implemented with a plurality of multipliers and adder trees may be arranged in parallel. In this case, the plurality of processing elements may be defined as at least one processing element including a plurality of operators.

The NPU internal memory 230 may store at least some of the feature map and weights of the artificial neural network model (ANN) that can be inferred from the plurality of processing elements 220.

Here, the artificial neural network model (ANN) may include information on data locality information or structure of the artificial neural network model.

The control unit 240 may control the plurality of processing elements 220 and the NPU internal memory 230 based on the data locality information or information on the structure of the artificial neural network model.

The function calculation unit 260 may calculate a feature value of the artificial neural network or calculate functions of various network layers, such as activation function calculation, normalization, and pooling. For example, the function calculation unit 260 may be connected to the plurality of processing elements 220 to process data output from the plurality of processing elements 220.

The control unit 240 may be configured to control the operation of the plurality of processing elements 220 for the inference operation of the neural processing unit (NPU) 200 and the read and write order of the NPU internal memory 230.

In various examples, the control unit 240 may be configured to control the plurality of processing elements 220 and the NPU internal memory 230 based on the data locality information or information about the structure of the artificial neural network model (ANN).

The control unit 240 may analyze the structure of the artificial neural network model to be operated in the plurality of processing elements 220 or may receive already analyzed information. For example, artificial neural network data that can be included in an artificial neural network model (ANN) may include node data (i.e., feature map) of each layer, layout data of layers, locality information or information on structure, and information on each layer, and at least a portion of weight data (i.e., weight kernel) of each connection network connecting nodes of each layer. The data of the artificial neural network may be stored in a memory provided inside the control unit 240 or the NPU internal memory 230. Here, the feature map of each layer may have a corresponding memory address value, respectively, and each weight data may have a corresponding memory address value, respectively.

In more detail, the control unit 240 may obtain, through the first memory 300, an address value in which the feature map and weight data of the layer of the artificial neural network model are stored, based on the data locality information or the structure information of the artificial neural network model (ANN). Accordingly, the control unit 240 may store the data acquired through the first memory 300 in the NPU internal memory 230.

In addition, the control unit 240 may schedule the operation order of the artificial neural network model/the operation order of the plurality of processing elements 220 to be performed by the neural processing unit 200 based on the data locality information or the structure information of the artificial neural network model (e.g., arrangement data of artificial neural network layers).

In general, the CPU schedules the operation order so that the most processing can be performed within the same time in consideration of data such as fairness, efficiency, stability, and response time.

Unlike this, since the control unit 240 performs scheduling based on data locality information or structure information of the artificial neural network model, it may operate differently from the general CPU scheduling concept.

In other words, the control unit 240 may operate the neural processing unit 200 in a processing order determined based on the data locality information or structure information of the artificial neural network model and/or the data locality information or structure information of the neural processing unit 200 to be used. However, this scheduling method is not limited to data locality information or information on structure.

To this end, the control unit 240 may store information on data locality information or structure of the artificial neural network, and may optimize the processing of the neural processing unit (NPU) 200 by scheduling the operation order of the artificial neural network model (ANN). As such, since the image processing system 10 for an artificial neural network infers an object through a separate neural processing unit (NPU) 200, the inference processing speed of the image may be further improved.

Figure 14:
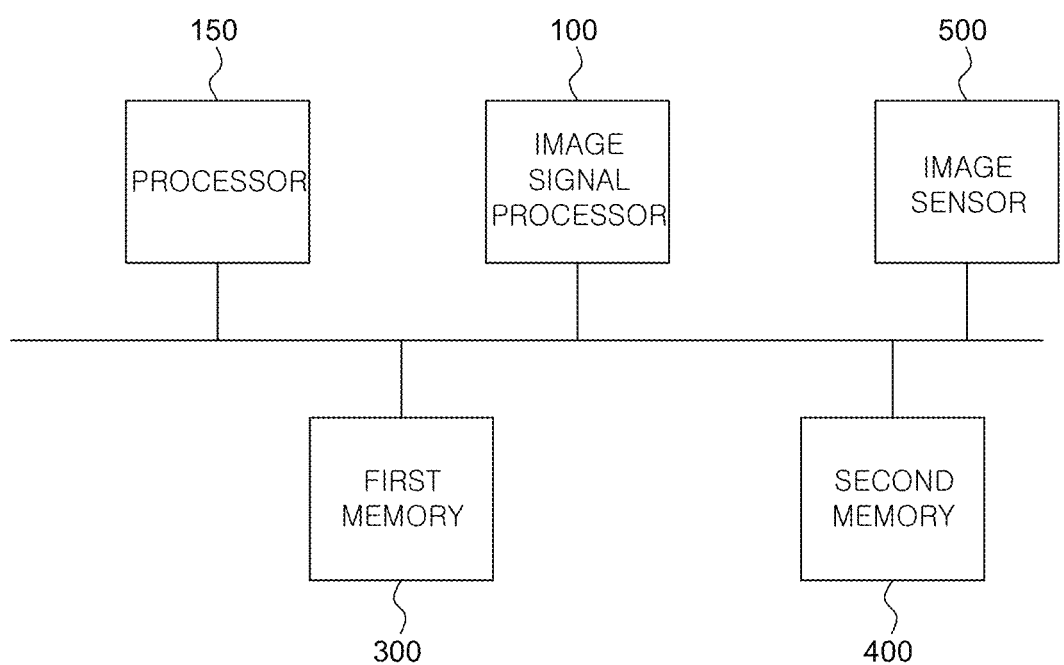
FIG. 14 is a schematic conceptual diagram of an image processing system for an artificial neural network according to another example of the present disclosure.

Meanwhile, FIG. 14 illustrates an image processing system for an artificial neural network according to another example of the present disclosure.

Referring to FIG. 14, when the image processing system 10 for an artificial neural network is applied to a device requiring an object inference function, such as autonomous driving and CCTV, as shown in FIG. 12, the image sensor 500 may be further included.

That is, when the image sensor 500 is included in the image processing system 10 for an artificial neural network, the processor 150 may immediately determine and provide an image correction parameter to be provided to the image signal processor 100 whenever a new image is inferred based on the inference accuracy profile of the artificial neural network model (ANN).

Hereinabove, the image processing system 10 for an artificial neural network according to various examples of the present disclosure has been described. According to the present disclosure, an image may be processed to improve the inference accuracy of the artificial neural network without being biased toward at least one attribute according to the user's visual perception by providing the detailed control value of the image signal processor 100 based on analyzing the image characteristics and the inference accuracy profile of the artificial neural network model (ANN).

A control method of an image signal processor for an artificial neural network according to an example of the present disclosure may be provided. The method may include a step of acquiring an image, a step of generating at least one image characteristic data corresponding to the image, and a step of determining an image correction parameter for improving an inference accuracy of an artificial neural network model based on the at least one image characteristic data and an inference accuracy profile of an artificial neural network model.

The step of determining the image correction parameter may include a step of analyzing the inference accuracy profile indicating a change in inference accuracy of the artificial neural network model, and a step of determining the image correction parameter for determining a degree of preprocessing of the image input to the artificial neural network model based on the inference accuracy profile and the image characteristic data.

The step of analyzing the inference accuracy profile may be the step of determining the change in inference accuracy of the artificial neural network model based on at least one image characteristic of brightness, noise, blurriness level, contrast ratio, and color temperature of the image.

The change in inference accuracy may indicate the inference accuracy of the artificial neural network model that changes according to a characteristic level of the image.

The step of analyzing the inference accuracy profile of the artificial neural network model may include a step of step-by-step modulating a reference image dataset applied to the artificial neural network model based on the at least one image characteristic, and a step of calculating a mean average precision (mAP) of the artificial neural network model for a plurality of image datasets modulated for each step.

The step of determining the image correction parameter may be a step of determining at least one of a plurality of image correction parameter presets using a preset library matched with the image signal processor that processes the image.

The step of determining the image correction parameter may include a step of calculating a compensation function for selectively determining the image correction parameter by matching the inference accuracy profile with the image characteristic data.

The image correction parameter may correspond to a value of a special function register of the image signal processor that processes the image.

A step of receiving a processed image based on the image correction parameter from the image signal processor that processes the image, and a step of outputting an inference result by inputting the processed image to the artificial neural network model may be included. A step of identifying an image sensor and the image signal processor capable of acquiring and processing the image may be included.

The step of determining the image correction parameter may include a step of correcting a compensation function for determining the image correction parameter by controlling a capturing parameter of the image sensor.

After the step of identifying, the method may further include a step of determining an artificial neural network model to infer an object based on the image.

The step of determining the image correction parameter may be a step of determining the image correction parameter for improving the inference accuracy of a plurality of artificial neural network models based on the inference accuracy profile of the plurality of artificial neural network models stored in a memory.

After the step of receiving the processed image, the step of providing the weight of the artificial neural network model together with the processed image by a separate processor for inference operation of the artificial neural network model may be included.

An image processing system for an artificial neural network includes a memory, an image signal processor configured to process an image stored in the memory, and a processor operatively connected to the memory and the image signal processor. The processor may acquire an image, generate at least one image characteristic data corresponding to the image, and determine an image correction parameter for improving inference accuracy of the artificial neural network based on at least one image characteristic data and an inference accuracy profile of the artificial neural network model.

A control method of an image signal processor for an artificial neural network according to an example of the present disclosure may include a step of acquiring an image, a step of determining at least one image characteristic data corresponding to the image, and a step of determining an image correction parameter for improving inference accuracy of the artificial neural network based on at least one image characteristic data and an inference accuracy profile of at least one artificial neural network model.

The image characteristic data may include at least one of histogram of the image (RGB, CbCr, Y Histogram), RGB maximum value, RGB minimum value, mean of pixel values, standard deviation, RGB sum of each pixel (Sum of color values), signal-to-noise ratio (SNR), frequency content and edge content.

The step of determining the image correction parameter may further include a step of analyzing an inference accuracy profile representing a change in inference accuracy of an artificial neural network model, and a step of determining the image correction parameter that determines a degree of preprocessing of an image input to an artificial neural network model based on the inference accuracy profile and image characteristic data.

The step of analyzing the inference accuracy profile may be the step of determining the change in inference accuracy of the artificial neural network model based on at least one image characteristic of brightness, noise, blurriness level, contrast ratio, and color temperature of the image.

The change in inference accuracy may indicate the inference accuracy of the artificial neural network model that changes according to a characteristic level of the image.

The step of analyzing the inference accuracy profile of the artificial neural network model may include a step of step-by-step modulating a reference image dataset applied to the artificial neural network model based on the at least one image characteristic, and a step of calculating a mean average precision (mAP) of the artificial neural network model for a plurality of image datasets modulated for each step.

The step of determining of the image correction parameter may be a step of determining at least one of a plurality of image correction parameter presets using a preset library matched with an image signal processor that processes an image.

The step of determining the image correction parameter may include a step of calculating a compensation function for selectively determining the image correction parameter by matching the inference accuracy profile with the image characteristic data.

The image correction parameter may correspond to a value of a special function register of an image signal processor that processes an image.

Control method of image signal processor for artificial neural network may further include a step of receiving the processed image based on the image correction parameter from the image signal processor that processes the image, and a step of outputting the inference result by inputting the processed image to the artificial neural network model.

The method for controlling an image signal processor for an artificial neural network may further include a step of identifying an image sensor and an image signal processor capable of acquiring and processing an image.

The step of determining the image correction parameter may further include a step of correcting a compensation function that determines the image correction parameter by controlling a capturing parameter of the image sensor.

The step of determining the image correction parameters may be a step of determining image correction parameters for improving the inference accuracy of the plurality of artificial neural network models based on the inference accuracy profiles of the plurality of artificial neural network models stored in the memory.

According to an example of the present disclosure, an image processing system for an artificial neural network may include an image signal processor configured to process an image; and a compensation unit operatively coupled to the image signal processor.

The compensation unit may be configured to acquire an image, generate at least one image characteristic data corresponding to the image, acquire at least one inference accuracy profile, and determine an image correction parameter of an image signal processor based on the at least one image characteristic data and the at least one inference accuracy profile.

The image characteristic data may include at least one of histogram of the image (RGB, CbCr, Y Histogram), RGB maximum value, RGB minimum value, mean of pixel values, standard deviation, RGB sum of each pixel (Sum of color values), signal-to-noise ratio (SNR), frequency content and edge content.

The image processing system for an artificial neural network may further include a neural processing unit configured to process the artificial neural network model.

The compensation unit may be configured to selectively determine an image correction parameter that determines a degree of preprocessing of an image input to the artificial neural network model based on the at least one inference accuracy profile and the image characteristic data.

The at least one inference accuracy profile may include information on change in inference accuracy of an artificial neural network model corresponding to at least one of brightness, noise, blurriness level, contrast ratio, and color temperature of an image.

The compensation unit may further include a preset library configured to control the image signal processor.

The compensation unit may selectively determine at least one of a plurality of image correction parameter presets of the preset library.

The image correction parameter may correspond to a value of a special function register of the image signal processor.

The neural processing unit may be configured to receive an image processed by the image signal processor, input the processed image to the artificial neural network model, and output an inference result.

The image processing system for an artificial neural network may further include an image sensor capable of acquiring an image.

The compensation unit may be configured to control the imaging parameter of the image sensor based on the at least one inference accuracy profile.

The compensation unit may be configured to identify the image signal processor.

The neural processing unit may be configured to process an inference operation of the artificial neural network model based on the processed image and the weights of the artificial neural network model.

Although an example of the present disclosure has been described in detail with reference to the accompanying drawings, the present disclosure is not necessarily limited to these examples, and various modifications may be made within the scope without departing from the spirit of the present disclosure. Accordingly, the examples disclosed in the present disclosure are for explanation rather than limiting the technical spirit of the present disclosure, and the scope of the technical spirit of the present disclosure is not limited by these examples. Therefore, it should be understood that the examples described above are illustrative in all respects and not restrictive. The protection scope of the present disclosure should be construed by the following claims, and all technical ideas within the scope equivalent thereto should be construed as being included in the scope of the present disclosure.

Examples of the present disclosure published in the present specification and drawings are merely specific examples to easily explain the technical content of the present disclosure and help the understanding of the present disclosure, and are not intended to limit the scope of the present disclosure. It will be apparent to those of ordinary skill in the art to which the present disclosure pertains that other modified examples based on the technical spirit of the invention can be implemented in addition to the examples described herein.

[National R&D project supporting this invention]
[Project unique number] 1711170668
[Project number] 2022-0-00248-001
[Name of Ministry] Ministry of Science and ICT
[Name of task management (specialized) institution] Information and Communication Planning and Evaluation Institute
[Research project name] PIM artificial intelligence semiconductor core technology development (design)
[Research Title] Development of CXL-based PIM semiconductor technology for multiple DRAM modules considering memory consistency.
[Contribution rate] 1/1
[Name of the organization performing the task] DeepX Co., Ltd.
[Research period] 2022.04.01~2022.12.31

What is claimed is:

1. A processing method of an image signal processor for an artificial neural network, the processing method comprising:
    deriving an image preprocessing degree from an inference accuracy profile of at least one artificial neural network model for improving an inference accuracy of an artificial neural network model, and
    processing an image according to the image preprocessing degree,
    wherein the inference accuracy profile is determined based on a plurality of image datasets modulated in specific units repeatedly.

2. The processing method of claim 1, wherein the image preprocessing degree is based on an image characteristic data including at least one of a histogram of the image, an RGB maximum value, an RGB minimum value, a mean of pixel values, a standard deviation, an RGB sum of each pixel, a signal-to-noise ratio, frequency content, and edge content.

3. The processing method of claim 1, wherein the deriving the image preprocessing degree comprises:
    analyzing the inference accuracy profile indicating a change in inference accuracy of the artificial neural network model, and
    determining the image preprocessing degree of the image input to the artificial neural network model based on the inference accuracy profile.

4. The processing method of claim 3, wherein the change in inference accuracy is determined based on at least one of brightness, noise, blurriness level, contrast ratio, and color temperature of the image.

5. The processing method of claim 4, wherein the change in inference accuracy indicates the inference accuracy of the artificial neural network model that changes according to a characteristic level of the image.

6. The processing method of claim 4, wherein the analyzing the inference accuracy profile comprises:
    modulating a reference image dataset applied to the artificial neural network model; and
    calculating a mean average precision (mAP) of the artificial neural network model for a plurality of image datasets modulated for each step.

7. The processing method of claim 3, wherein the determining the image preprocessing degree further comprises calculating a compensation function for selectively determining the image preprocessing degree.

8. The processing method of claim 1, wherein the image preprocessing degree includes at least one of a plurality of image preprocessing degree presets, the plurality of image preprocessing degree presets determined using a preset library matched with the image signal processor that processes the image.

9. The processing method of claim 1, wherein the image preprocessing degree corresponds to a value of a special function register of the image signal processor that processes the image.

10. The processing method of claim 1, further comprising:
    receiving a processed image based on the image preprocessing degree from the image signal processor that processes the image; and
    outputting an inference result by inputting the processed image to the artificial neural network model.

11. The processing method of claim 1, further comprising:
    identifying an image sensor and the image signal processor capable of acquiring and processing the image.

12. The processing method of claim 11, wherein the determining the image preprocessing degree further comprises correcting a compensation function for determining the image preprocessing degree by controlling a capturing parameter of the image sensor.

13. The processing method of claim 1, wherein the determining the image preprocessing degree includes determining the image preprocessing degree for improving the inference accuracy of a plurality of artificial neural network models based on the inference accuracy profile of the plurality of artificial neural network models stored in a memory.

14. The processing method of claim 1,
    wherein the at least one artificial neural network model includes a plurality of artificial neural network models, and
    wherein the image preprocessing degree is determined based on the inference accuracy profile of the plurality of artificial neural network models stored in a memory.

15. An image processing system for an artificial neural network, the image processing system comprising:
    a compensation unit configured to derive an image preprocessing degree from an inference accuracy profile of at least one artificial neural network model for improving an inference accuracy of an artificial neural network model, and
    an image signal processor configured to image-process an image according to the image preprocessing degree, wherein the inference accuracy profile is determined based on a plurality of image datasets modulated in specific units repeatedly.

16. The image processing system of claim 15, wherein the image preprocessing degree is based on an image characteristic data including at least one of a histogram of the image, an RGB maximum value, an RGB minimum value, a mean of pixel values, a standard deviation, an RGB sum of each pixel, a signal-to-noise ratio, frequency content, and edge content.

17. The image processing system of claim 15, further comprising a neural processing unit configured to process an artificial neural network model.

18. The image processing system of claim 17, wherein the neural processing unit is further configured to receive the image processed by the image signal processor, input the processed image to the artificial neural network model, and output an inference result.

19. The image processing system of claim 17, wherein the neural processing unit is further configured to process an inference operation of the artificial neural network model based on the processed image and weights of the artificial neural network model.

20. The image processing system of claim 15, wherein the inference accuracy profile includes information on the change in inference accuracy of the artificial neural network model corresponding to at least one of brightness, noise, blurriness level, contrast ratio, and color temperature of the image.

21. The image processing system of claim 15,
wherein the compensation unit comprises a preset library configured to control the image signal processor, and
wherein the compensation unit is further configured to selectively determine at least one of a plurality of image preprocessing degree presets of the preset library.

22. The image processing system of claim 15, wherein the image preprocessing degree corresponds to a special function register value of the image signal processor.

23. The image processing system of claim 15, further comprising an image sensor capable of acquiring an image,
wherein the compensation unit is further configured to control a capturing parameter of the image sensor based on the at least one inference accuracy profile.

24. The image processing system of claim 23, wherein the compensation unit is further configured to identify the image sensor and the image signal processor.

* * * * *